US007675520B2

(12) United States Patent
Gee et al.

(10) Patent No.: US 7,675,520 B2
(45) Date of Patent: Mar. 9, 2010

(54) SYSTEM, METHOD AND COMPUTER PROGRAM FOR CREATING TWO DIMENSIONAL (2D) OR THREE DIMENSIONAL (3D) COMPUTER ANIMATION FROM VIDEO

(75) Inventors: Will Gee, Sparks, MD (US); David Thompson, Westminster, MD (US); Murray Taylor, Phoenix, MD (US); Martin Deriso, Towson, MD (US)

(73) Assignee: Digital Steamworks, LLC, Hunt Valley, MD (US)

( * ) Notice: Subject to any disclaimer, the term of this patent is extended or adjusted under 35 U.S.C. 154(b) by 588 days.

(21) Appl. No.: 11/635,001

(22) Filed: Dec. 7, 2006

(65) Prior Publication Data

US 2007/0146372 A1 Jun. 28, 2007

Related U.S. Application Data

(60) Provisional application No. 60/748,587, filed on Dec. 9, 2005.

(51) Int. Cl.
*G06T 15/70* (2006.01)
(52) U.S. Cl. .................. 345/473; 345/474; 345/619; 707/200; 348/143
(58) Field of Classification Search .................. 345/473, 345/474, 619; 348/143; 707/200
See application file for complete search history.

(56) References Cited

U.S. PATENT DOCUMENTS

| 5,513,854 A | 5/1996 | Daver et al. |
| 5,982,389 A | 11/1999 | Guenter et al. |
| 6,057,833 A | 5/2000 | Heidmann et al. |

(Continued)

FOREIGN PATENT DOCUMENTS

AU 734 202 6/2001

(Continued)

OTHER PUBLICATIONS

Kanade, Takeo, et al., "The 3D Room: Digitizing Time-Varying 3D Events by Synchronized Multiple Video Streams," CMU-RI-TR-98-34, The Robotics Institute, Carnegie Mellon University, Dec. 28, 1998.

(Continued)

*Primary Examiner*—Kimbinh T Nguyen
(74) *Attorney, Agent, or Firm*—Venable LLP; Ralph P. Albrecht; Todd R. Farnsworth

(57) ABSTRACT

In an exemplary embodiment of the present invention a system, method and computer program product for creating at least a two dimensional or three dimensional (3D) datastream from a video with moving objects is disclosed. In an exemplary embodiment of the present invention, a method of creating animated objects in 2D or 3D from video, may include: receiving video information which may include a plurality of frames of digital video; receiving and adding metadata to the video information, the metadata relating to at least one object in motion in the digital video; and interpreting the metadata and the video information and generating a datastream in at least 2D. In an exemplary embodiment, 2D, 3D or more dimensional data may be used to provide an animation of the event of which the video was made. In an exemplary embodiment, a 2D or 3D gametracker, or play reviewer may be provided allowing animation of motion events captured in the video.

44 Claims, 16 Drawing Sheets

U.S. PATENT DOCUMENTS

| | | | |
|---|---|---|---|
| 6,071,002 A | 6/2000 | Katayama et al. | |
| 6,072,496 A | 6/2000 | Guenter et al. | |
| 6,088,042 A | 7/2000 | Handelman et al. | |
| 6,126,449 A | 10/2000 | Burns | |
| 6,144,385 A | 11/2000 | Girard | |
| 6,163,322 A | 12/2000 | LaChapelle et al. | |
| 6,384,819 B1 | 5/2002 | Hunter | |
| 6,404,426 B1 | 6/2002 | Weaver | |
| 6,535,215 B1 | 3/2003 | DeWitt et al. | |
| 6,537,076 B2 | 3/2003 | McNitt et al. | |
| 6,563,503 B1 | 5/2003 | Comair et al. | |
| 6,587,574 B1 | 7/2003 | Jeannin | |
| 6,590,536 B1 | 7/2003 | Walton | |
| 6,593,936 B1 | 7/2003 | Huang et al. | |
| 6,661,418 B1 | 12/2003 | McMillan et al. | |
| 6,674,877 B1 | 1/2004 | Jojic et al. | |
| 6,677,858 B1 | 1/2004 | Faris et al. | |
| 6,677,967 B2 | 1/2004 | Sawano et al. | |
| 6,707,487 B1 | 3/2004 | Aman et al. | |
| 6,711,590 B1 | 3/2004 | Lennon et al. | |
| 6,761,637 B2 | 7/2004 | Weston et al. | |
| 6,784,826 B2 | 8/2004 | Kane et al. | |
| 6,807,290 B2 | 10/2004 | Liu et al. | |
| 6,831,603 B2 | 12/2004 | Menache | |
| 6,947,044 B1 | 9/2005 | Kulas | |
| 7,142,225 B1 * | 11/2006 | Boler et al. | 345/619 |
| 2005/0093976 A1 | 5/2005 | Valleriano et al. | |
| 2006/0200745 A1 * | 9/2006 | Furmanski et al. | 715/500.1 |

FOREIGN PATENT DOCUMENTS

WO      WO-00/64190      10/2000

OTHER PUBLICATIONS

Malerczyk, Cornelius et al., "3D Reconstruction of Sports Events for Digital TV," Journal of WSCG, vol. 11, No. 1, ISSN 1213-6972, WSCG 2003, Plzen, Czech Republic, Feb. 37, 2003.

Brochure, Verhaert Wearable Systems, Web page print-out, Nov. 11, 2005.

Moezzi, Saied, et al., "Reality Modeling and Visualization from Multiple Video Sequences," IEEE Computer Graphics, Nov. 1996 (vol. 16, No. 6), pp. 58-63.

Moezzi, Saied et al., "Virtual View Generation for 3D Digital Video," IEEE MultiMedia archive, vol. 4, Issue 1, Jan. 1997.

Wurmlin, Stephan et al., "3D Video Recorder," date unknown (at least 2001), printed Nov. 2005.

Webpage print-out of Hideo Saito, Oct. 20, 2003.

* cited by examiner

SYSTEM, METHOD AND COMPUTER PROGRAM FOR CREATING TWO DIMENSIONAL (2D) OR THREE DIMENSIONAL (3D) COMPUTER ANIMATION FROM VIDEO

CROSS-REFERENCE TO RELATED APPLICATIONS

The present application is a Non-Provisional U.S. Patent Application and claims the benefit of U.S. Provisional Patent Application No. 60/748,587, entitled "SYSTEM, METHOD AND COMPUTER PROGRAM PRODUCT FOR CREATING A THREE DIMENSIONAL (3D) ANIMATION FROM VIDEO" to TAYLOR et al., of common assignee to the present invention, the contents of which are incorporated herein by reference in their entireties.

BACKGROUND OF THE INVENTION

1. Field of the Invention

The present invention relates generally to video, and more particularly to moving objects in video.

2. Related Art

Conventionally, studying video of prior sporting events is a well known method that athletes have used to prepare for a sporting event. For example, in the case of American football, systems have been used to review or playback video in a play-by-play format. An example of such a solution is TALKING X'S & O'S—COACHES LIBRARY, including XOS Full-Court Products Suite (including XOS Director, XOSportStation, XOSketch, XOS PlayTools, XOSmart, XOScheduler, XOS nStream, and XOS VEGA) available from XOS Technologies, Inc. of 601 Codisco Way, Sanford, Fla. 32771. Such a system allows a coach or player to fast forward, pause, or rewind portions of a game in a play-by-play mode using an indexed video database. It is believed that 30 of the top 32 NFL teams and 300 of the top NCAA football programs use this system.

Conventional solutions have various shortcomings. Unfortunately, conventional play-by-play video playback systems are limited by the camera angles of the captured video. For example, if the video is taken from a specific sideline, then the play may only be reviewed from that camera angle.

What is needed then is an improved process that overcomes shortcomings of conventional solutions.

SUMMARY OF THE INVENTION

In an exemplary embodiment of the present invention a system, method and computer program product for creating three dimensional (3D) animation from a video with moving objects is disclosed.

In an exemplary embodiment of the present invention, a method of creating animated objects in 3D from video, may include: receiving video information may include a plurality of frames of digital video; receiving and adding metadata to the video information, the metadata relating to at least one object in motion in the digital video; and interpreting the metadata and the video information and generating a final 3D animation.

In an exemplary embodiment of the present invention, the method may include where the receiving the metadata may include: receiving the metadata from at least one of a person, an agent and/or a software agent.

In an exemplary embodiment of the present invention, the method may include where the receiving the metadata may include receiving the metadata may include at least one of: discrete event information about the object in motion, ongoing event information about the object in motion, movement information, state information, a starting position, and/or an ending position.

In an exemplary embodiment of the present invention, the method may include where the receiving the metadata may include: receiving the metadata may include at least one of discrete event information about the object in motion, and/or ongoing event information about the object in motion.

In an exemplary embodiment of the present invention, the method may include where the receiving the metadata may include: receiving the metadata may include at least one of discrete event information, and/or a state of motion.

In an exemplary embodiment of the present invention, the method may include where the metadata further may include: receiving the metadata may include a starting position.

In an exemplary embodiment of the present invention, the method may further include: providing for export of the final 3D animation.

In an exemplary embodiment of the present invention, the method may further include: providing for rendering the final 3D animation.

In an exemplary embodiment of the present invention, the method may further include: providing for interactive access using a 3D player of the final 3D animation.

In another exemplary embodiment of the present invention, the method may further include: providing a data stream, which may be in extensible markup language (XML) or otherwise, for integration with other products, including, e.g., but not limited to, an online game tracker application, a fantasy football site, and/or a web broadcast.

In an exemplary embodiment of the present invention, the method may further include: creating a virtual camera and matching the virtual camera's motion to observed motion of a camera originally capturing the video information.

In another exemplary embodiment, camera motion data may be obtained by use of an instrumented camera, such as, e.g., but not limited to, the cameras used by SportVision.com of Chicago, Ill. and Mountainview, Calif., for the first down line. In essence, the camera may record a metadata stream with the video that stores the camera's pan, zoom, and tilt data. According to another exemplary embodiment, another way to obtain camera motion data, may be to use static footage, i.e. where the camera stays in the same place and doesn't move, rotate, or zoom, creating no camera motion. According to an exemplary embodiment, a high definition camera may be used. With the enhanced resolution of a high definition camera, extensive details in video images may still be achieved to discern details, even when using a static camera.

In an exemplary embodiment of the present invention, the method may include where matching the camera motion may include at least one of: a brute force method; a software application; a motion tracking process; an automated camera location generating process; a radio frequency identifier (RFID) capable of determining a location of the object in motion; a global positioning system (GPS) positioning system of determining a location of the object in motion; a camera based system for determining a location of the object in motion; and/or georeferencing a location of the object in motion.

In an exemplary embodiment of the present invention, the method may include where the receiving the video information may include: at least one of: receiving video footage from a single camera; and/or receiving video footage from a plurality of cameras.

In an exemplary embodiment of the present invention, the method may include where the receiving the video information may include: receiving sporting event video footage.

In an exemplary embodiment of the present invention, the method may include where the receiving the sporting event video footage may include at least one of: receiving footage of at least one team of players; receiving team sporting event footage; receiving football footage; receiving basketball footage; receiving soccer footage; receiving hockey footage; receiving tennis footage; receiving individual sport footage; receiving NASCAR racing footage; receiving Formula One racing footage; receiving horse racing footage; receiving Olympic sporting event footage; receiving bowling footage; and/or receiving golf footage. According to an exemplary embodiment, the sporting events tracked, and/or animated may be sponsored by such licensed organizations as, e.g., but not limited to, NFL, MLB, NASCAR, The Olympic Games, NHL, PGA TOUR, LPGA Tour, NBA, NCAA, WTA, MLS, IRL, X Games, FIFA Worldcup, etc. Exemplary embodiments of the present invention may be used to track and/or animate sporting events including world's most prominent sporting events, including the Super Bowl, the Summer and Winter Olympic Games, Daytona 500, FIFA World Cup, Indianapolis 500, Formula One Races, NASCAR Races, World Series, Wimbledon, Tennis Cups, NBA Finals, U.S. Open Golf Championship, British Open, NCAA March Madness and Final Four, NCAA Bowl Championship Series (BCS), NCAA football, basketball, etc.

In an exemplary embodiment of the present invention, the method may include where the receiving the video information may include: receiving football video footage may include two opposing teams of players engaged in playing a series of plays, and wherein the plays may include at least one of: an offensive play, a defensive play, and/or a special teams play.

In an exemplary embodiment of the present invention, the method may include where the receiving the video information may include: receiving surveillance video footage.

In an exemplary embodiment of the present invention, the method may include where the receiving the video information may include: receiving military video footage.

In an exemplary embodiment of the present invention, the method may include where the receiving the video information may include: receiving security camera video footage.

In an exemplary embodiment of the present invention, the method may include where In an exemplary embodiment of the present invention, the method may include where the receiving and the adding the metadata may include: providing a moving object tool.

In an exemplary embodiment of the present invention, the method may include where the providing the moving object tool may include at least one of: providing at least one directional object identifier representing the object in motion; and/or receiving an indication of at least one of the proper location and/or orientation of the directional object for a given frame of the video information.

In an exemplary embodiment of the present invention, the method may include where the providing the moving object tool may include at least one of: providing a plurality of directional object identifiers representing each of a plurality of objects in motion; and/or receiving an indication of the proper Locations and orientations of each of the directional objects for a given frame of the video information.

In an exemplary embodiment of the present invention, the method may include where the providing the plurality of directional object identifiers may include: providing one of the plurality of directional object identifiers for at least one participant of at least one team appearing in the video information.

In an exemplary embodiment of the present invention, the method may include where the providing the plurality of directional object identifiers may include: providing a plurality of extruded polygon directional object identifiers.

In an exemplary embodiment of the present invention, the method may include where the providing the plurality of extruded polygon directional object identifiers may include: a plurality of homeplate-shaped pentagonally extruded directional object identifiers, wherein a pointed end of each of the identifiers is pointed in a direction of movement of each of the participants.

In an exemplary embodiment of the present invention, the method may include where the providing the moving object tool may include at least one of: providing a block out tool for scrubbing the video information, and/or allowing movement of and/or rotation of the directional object identifiers.

In an exemplary embodiment of the present invention, the method may include where the providing the moving object tool may include at least one of: providing a block out tool for scrubbing the video information, and/or allowing movement of and/or rotation of the directional object identifiers.

In an exemplary embodiment of the present invention, the method may include where the interpreting the metadata and the video information and generating a final 3D animation may include: selecting from a plurality of predetermined animation objects, a selected animation object to associate with the directional object.

In an exemplary embodiment of the present invention, the method may include where the interpreting the metadata and the video information and generating a final 3D animation may include: selecting from a plurality of predetermined animation objects, a selected animation object to associate with the directional object.

In an exemplary embodiment of the present invention, the method may include where the interpreting the metadata and the video information and generating a final 3D animation may include: replacing the directional object with a 3D character object.

In an exemplary embodiment of the present invention, the method may include where the interpreting the metadata and the video information and generating a final 3D animation may include: replacing the directional object with a 3D character object.

In an exemplary embodiment of the present invention, the method may include where the providing the moving object tool may include: providing a ball object identifier.

In an exemplary embodiment of the present invention, the method may include where the interpreting the metadata and the video information and generating a final 3D animation may include: adding a ball object.

In an exemplary embodiment of the present invention, the method may include where the providing the moving object tool may include: providing a first down plane object identifier.

In an exemplary embodiment of the present invention, the method may include where the providing the moving object tool may include: providing an end zone plane object identifier.

In another exemplary embodiment of the present invention, a system of creating animated objects in 3D from video, may include: means for receiving video information may include a plurality of frames of digital video; means for receiving and adding metadata to the video information, the metadata relating to at least one object in motion in the digital video; and means for interpreting the metadata and the video information and for generating a final 3D animation.

In another exemplary embodiment of the present invention, a machine-readable medium that provides instructions, which when executed by a computing platform, cause the computing platform to perform operations creating animated objects in 3D from video, the operations may include a method may include: receiving video information may include a plurality of frames of digital video; receiving and adding metadata to the video information, the metadata relating to at least one object in motion in the digital video; and interpreting the metadata and the video information and generating a final 3D animation.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

A preferred embodiment as well as various other exemplary embodiments of the invention is discussed below. While specific exemplary embodiments are discussed, it should be understood that this is done for illustration purposes only. A person skilled in the relevant art will recognize that other components and configurations can be used without parting from the spirit and scope of the invention.

Figure 1:
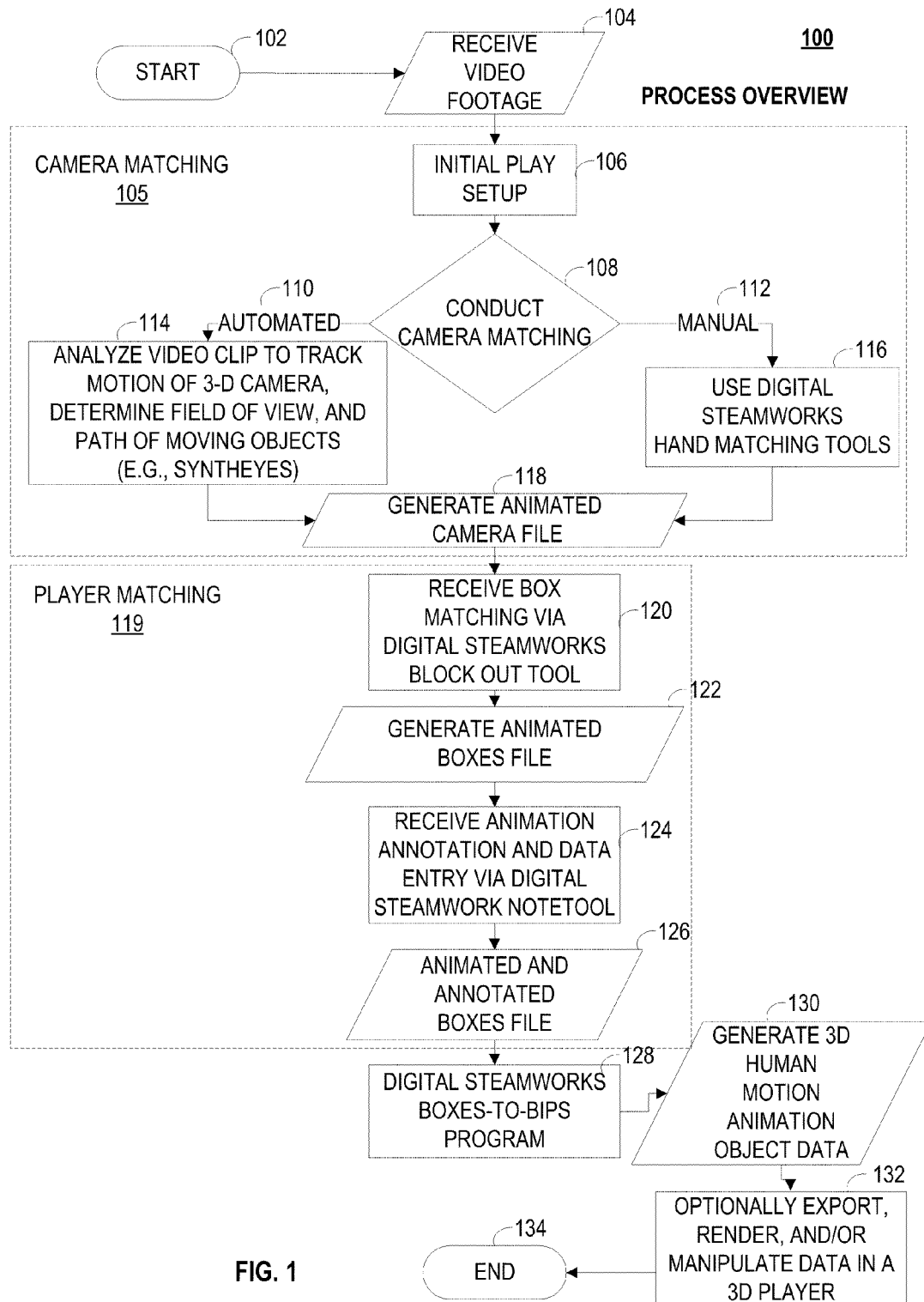
FIG. 1 depicts an exemplary embodiment of a flow diagram of an exemplary camera matching and player matching process overview according to an exemplary embodiment of the present invention.

FIG. 1 depicts an exemplary embodiment of a flow diagram 100 of an exemplary camera matching 105 and player matching 119 process overview according to an exemplary embodiment of the present invention. In an exemplary embodiment, flow diagram may begin with 102 and may continue immediately with 104.

In 104, video footage may be received. From 104, flow diagram 100 may continue immediately with camera matching 105. From camera matching 105, flow diagram 100 may continue with player matching 119.

In camera matching 105, in an exemplary embodiment, flow diagram 100 may begin with initial play setup 106.

In 106, the play may be initially set up. This may include, in an exemplary embodiment, various steps. In an exemplary embodiment, initial set up may include, e.g., but not limited to, receiving footage, importing footage into a video editing program (e.g., Combustion, Premiere, Pinnacle), editing footage into separate movies for each play, importing the movie of a play into the background of a viewport in 3d Studio Max (or similar digital content creation (DCC) application), and/or matching the camera. In an exemplary embodiment, 3dStudio Max® available from AutoDesk® of San Rafael, Calif., USA may be used as a digital content creation (DCC) application. Exemplary video editing software programs may include, e.g., but not limited to, Combustion® available from AutoDesk® of San Rafael, Calif., USA; Premiere® available from Adobe® Systems, Inc. of San Jose, Calif., USA; Pinnacle™, a division of Avid Technology, Inc. of Mountainview, Calif., USA. From 106, flow diagram 100 may continue with 108.

In 108, it may be determined how camera matching may be conducted. In an exemplary embodiment, if it is determined that camera matching may be done manually, then flow diagram 100 may continue as shown in 112, with 116. In an exemplary embodiment, if it is determined that camera matching may be done automatically, then flow diagram 100 may continue as shown in 110 with 114.

According to an exemplary embodiment, camera motion data may also be obtained using an instrumented camera, like the cameras used by SportVision.com of Chicago, Ill. and Mountainview, Calif. for providing the first down line. An instrumented camera may record a metadata stream along with the video that stores the camera's pan, zoom, and tilt. According to another exemplary embodiment, it is also possible to obtain camera motion data by using static footage, i.e. where the camera stays in the same place and doesn't move, rotate, or zoom.

In 114, automated camera matching may include analyzing the received video footage clip to track motion of a 3-D camera, a field of view may be determined, and the path of moving objects may be determined. These may be accomplished using any of a number of well known systems including, e.g., but not limited to, SYNTHEYES™ available from Andersson Technologies LLC of Philadelphia, Pa., USA. From 114, flow diagram 100 may continue with 118.

SynthEyes, e.g., performs both fully automatic tracking, including background batch processing, as well as efficient supervised tracking. Camera tracking enables effects such as 3-D character insertion, virtual set extension, matte painting insertion, architectural previsualization, crash reconstruction, and transparent effects. SynthEyes offers a complete high-end feature set, including camera tracking, motion capture, object building, object tracking, camera+object tracking, multiple-shot tracking, tripod (2.5-D) tracking, zooms, lens distortion, light solving, RAM playback, rotoscoped object separation and more. SynthEyes offers complete control over the tracking process for challenging shots, including efficient workflow for supervised trackers, combined automated/supervised tracking, and incremental solving. The Sizzle scripting language lets a user customize the standard exports, or add imports, exports, or tools. A user can customize the color scheme, keyboard mapping, and viewport configurations.

In 116, hand matching tools may be used to manual match the camera, building essentially a virtual camera. See FIG. 5 below. The match camera tool, in an exemplary embodiment, may include three (3) sliders. The 3 sliders may include one for yaw, one for pitch, one for zoom. The hand matching tool, according to an exemplary embodiment of the present invention, may be optimized for the special case of a football field, where the camera is usually stationary with the exception of panning or zooming. From 116, flow diagram 100 may continue with 118.

In 118, an animated camera file may be generated. From 118, flow diagram 100 may continue with player matching 119. Play matching 119 may begin with 120.

In 120, a user first make boxes as discussed further below with reference to FIG. 4. In an exemplary embodiment, a box refers to a polygon, in an exemplary embodiment, a homeplate shaped pentagon which may be extruded. In an exemplary embodiment, the extruded box may be placed on a player. In one exemplary embodiment, a group of such extruded boxes may be created at one time. In an exemplary embodiment, a group of a plurality of offensive and defensive team players may be created and placed on the GUI at the same time within the 3D animation system. A user may also move the boxes as discussed further below with reference to FIG. 6. In an exemplary embodiment, an input device, such as, e.g., but not limited to, the keyboard and/or mouse or pointing device may be used to indicate a key frame for where a player may begin to move.

One key may be used to advance time, another key may be used to move one of the extruded boxes over the location of the moving player. The user may determine, in which location the player is and in which direction the player is moving. A custom block out tool may also be used as is discussed further below, with reference to FIG. 7. The block out tool may be used to scrub the video footage, to move and rotate the extruded blocks quickly. From 120, flow diagram 100 may continue with 122.

In 122, an animated boxes file may be created. From 122, flow diagram 100 may continue with 124.

In 124, optional animation annotations may be added and any additional data entry, which may include a note tool, such as, e.g., but not limited to, setting states as discussed further with reference to FIG. 8, below. From 124, flow diagram 100 may continue with 126 to forward a file with the animated and annotated boxes file.

In 126, the animated and automated boxes file may be forwarded to 128.

In 128, the boxes file may be passed through a boxes to BIPs method, as discussed further below with reference to FIG. 3. From 128, flow diagram 100 may continue with 130.

In 130, 3D human motion animation objects data maybe generated and may be exported or otherwise further processed or rendered. From 130, flow diagram 100 may continue with 132.

In 132, the 3D moving object animation data may be exported, rendered, and/or manipulated. From 132, flow diagram 100 may continue with 134 where in an exemplary embodiment, the process may immediately end.

Figure 2:
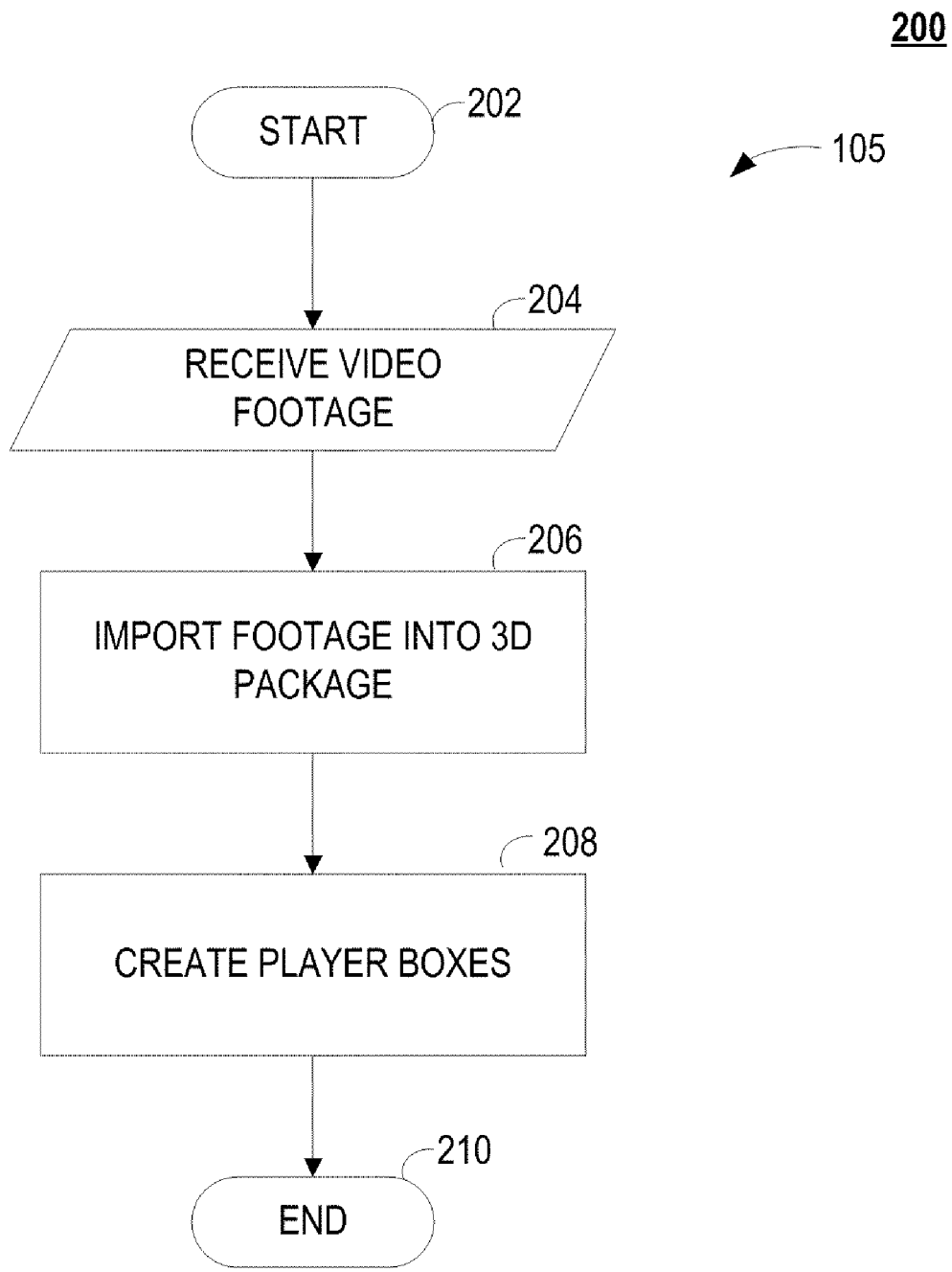
FIG. 2 depicts an exemplary embodiment of a flow diagram of an exemplary camera matching process according to an exemplary embodiment of the present invention.

FIG. 2 depicts an exemplary embodiment of a flow diagram 200 of an exemplary camera matching process 105 according to an exemplary embodiment of the present invention. In an exemplary embodiment, flow diagram 200 may begin with 202 and may continue immediately with 204.

In 204, video footage may be received. Video may be captured from any of various well known capture devices. Video from a camera may be stored in analog or digital form for example. The analog video may then be captured in digital form using a video capture device. Alternatively, stored footage in a first format may be converted into another format. Exemplary video formats include, but are not limited to, AVI, MPEG, etc. From 204, flow diagram 200 may continue with 206.

In 206, the video footage may be imported into a 3D package. In an exemplary embodiment, the 3D package may be a 3D digital content creation software application. In an exemplary embodiment, the 3D package may be a 3D object modeler/animator/renderer application. In an exemplary embodiment, the 3D package may be 3D Studio Max available from Autodesk and discussed further below. From 206, flow diagram 200 may continue with 208.

In 208, player boxes may be created. In an exemplary embodiment, the player boxes may be an extruded polygon. In an exemplary embodiment, the polygon may be a pentagon, and the pentagon may resemble a homeplate in an exemplary embodiment, but is not limited to such geometric shapes. Instead any other representation or symbol desirable to represent a participant in the video event may be used. From 208, flow diagram 200 may continue with 210 and may end.

Figure 3:
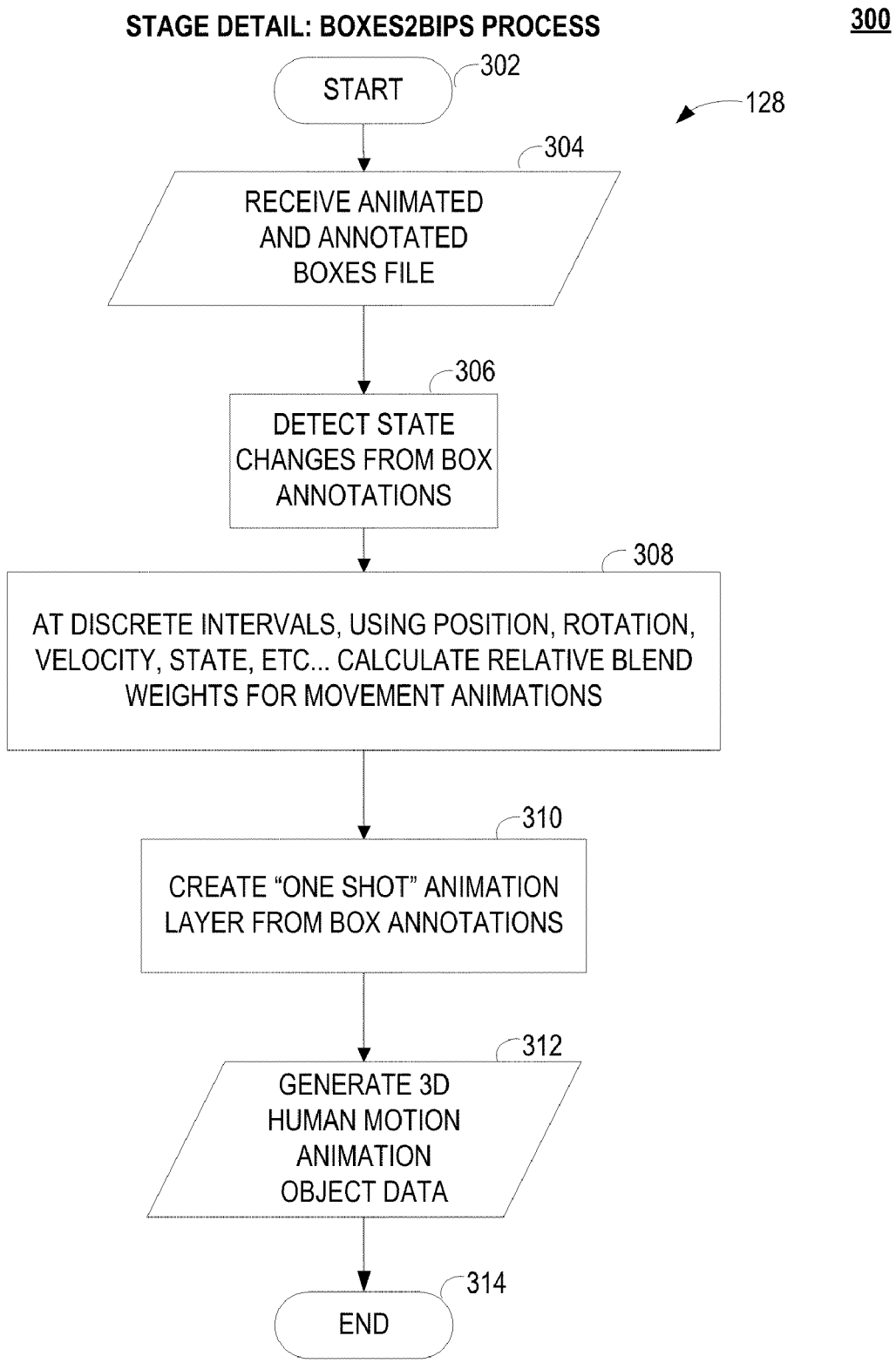
FIG. 3 depicts an exemplary embodiment of a flow diagram of an exemplary boxes2bips matching process according to an exemplary embodiment of present invention.

FIG. 3 depicts an exemplary embodiment of a flow diagram 300 of an exemplary boxes2bips matching process 128 according to an exemplary embodiment of present invention. In an exemplary embodiment, flow diagram 300 may begin with 302 and may continue immediately with 304.

In 304, an animated and annotated boxes file may be received. Box annotations may have been input by user selection such as that illustrated and discussed below with reference to FIG. 8. From 304, flow diagram 300 may continue with 306.

In 306, state changes may be detected from box annotations. From 306, flow diagram 300 may continue with 308.

In 308, relative blend weights for movement animations may be calculated. In an exemplary embodiment, the calculations may be at discrete intervals, using position, rotation, velocity, state, etc. From 308, flow diagram 300 may continue with 310.

In 310, a one shot animation layer may be created from box annotations.

In an exemplary embodiment, a "one shot" event may be a discrete event which occurs in time. Exemplary, but not limiting, one shot events in football may be a kickoff, a punt, and/or a field goal. Similarly, a goal kick, penalty kick, or kickoff may be a one shot event for soccer. From 310, flow diagram 300 may continue with 312.

In 312, in an exemplary embodiment, a 3D human motion animation object data may be generated. In the exemplary embodiment, a human sporting event is being described, thus the moving objects are humans. It will be apparent to those skilled in the art, that the moving object could be any living (e.g., human, horse, dog, etc.) or non-living (e.g., car, motorcycle, vehicle, ball, puck, etc.) which is a potentially moving object. From 312, flow diagram 300 may continue with 314. From 314, flow diagram 300 may immediately end.

Figure 4:
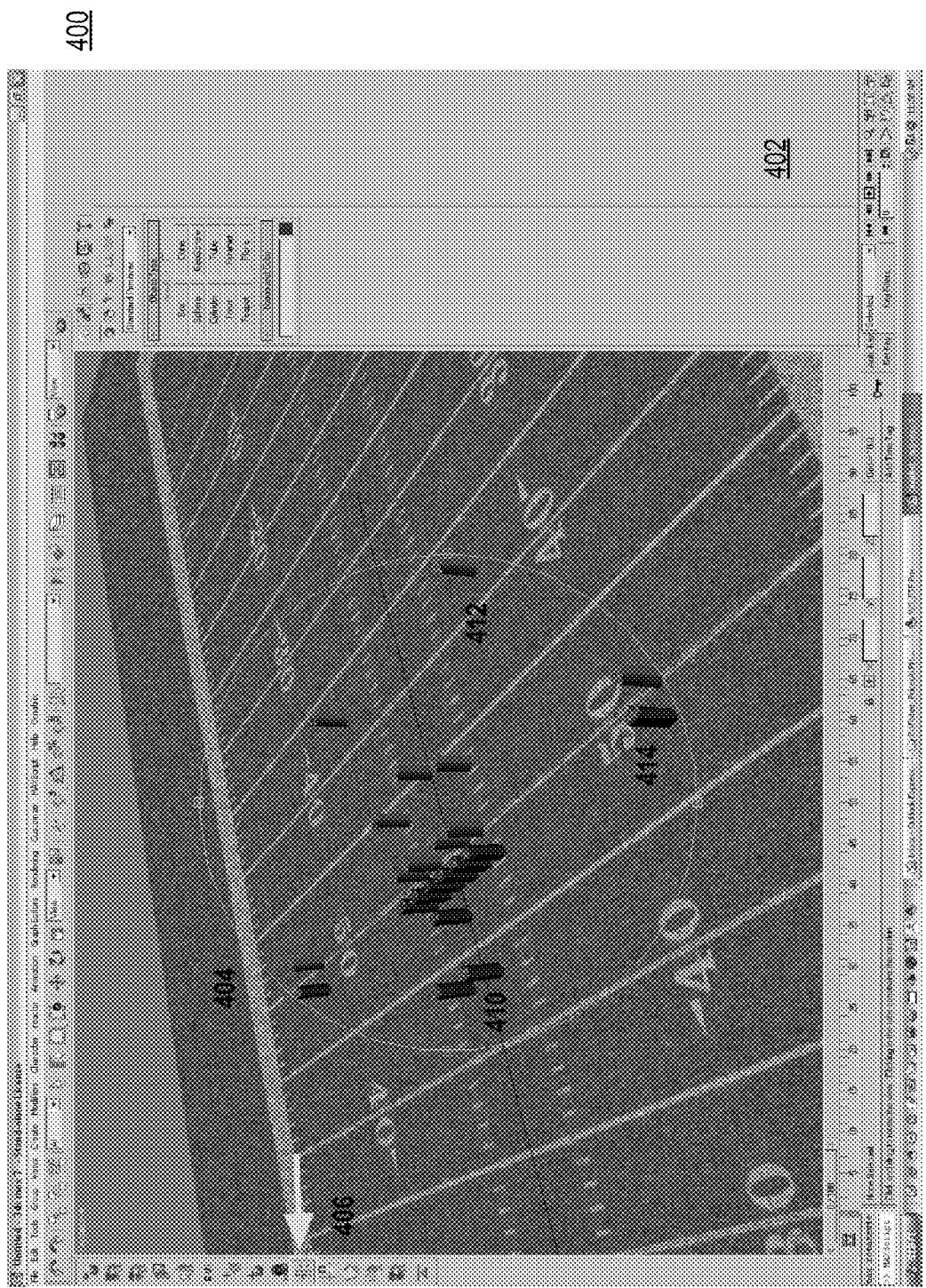
FIG. 4 depicts an exemplary embodiment of an exemplary screen shot of an exemplary graphical user interface (GUI) of an exemplary three dimensional (3D) animation environment showing an exemplary make boxes script tool icon used to create an exemplary group of offensive and defensive player identifiers, which may include in an exemplary embodiment, extruded pentagon boxes according to an exemplary embodiment of present invention.

FIG. 4 depicts an exemplary embodiment of an exemplary screen shot 400 of an exemplary graphical user interface (GUI) of an exemplary three dimensional (3D) animation environment 402 showing an exemplary make boxes script tool icon 406. The make boxes tool 406 may be used, in an exemplary embodiment, to create an exemplary group 408 of offensive player identifiers 410 and defensive player identifiers 412. The player identifiers 410, 412 may include, in an exemplary embodiment, extruded pentagon boxes 414, which may be placed in a default position (such as, e.g., but not limited to, an exemplary I-formation for offense 410 as shown) on an exemplary animated playing field 404 according to an exemplary embodiment of present invention. In an exemplary embodiment, twenty-two (22) extruded polygon boxes 414 representing corresponding to eleven (11) offensive and eleven (11) defensive player identifiers 410, 412 may be placed on the playing field 404 and may be manually positioned by a user. In an exemplary embodiment, the user may be a person. In another exemplary embodiment, the user may be a software agent which may perform the task of moving the boxes 414 to their correct positions. Of course the number of boxes 414 will depend on the type of event, or sporting event being recreated. For example, in the case of basketball, 10 players (5 offensive and 5 defensive players) may be used. In the case of tennis, for singles, two players, and for doubles, four players may be used. In the case of a non-sporting event, an appropriate number of boxes 414 may be created, based on the number of moving objects expected in a given video sequence. In one exemplary embodiment, the number of boxes 414 and their initial positions may be user selectable prior to instantiating the make boxes tool 406.

Figure 5:
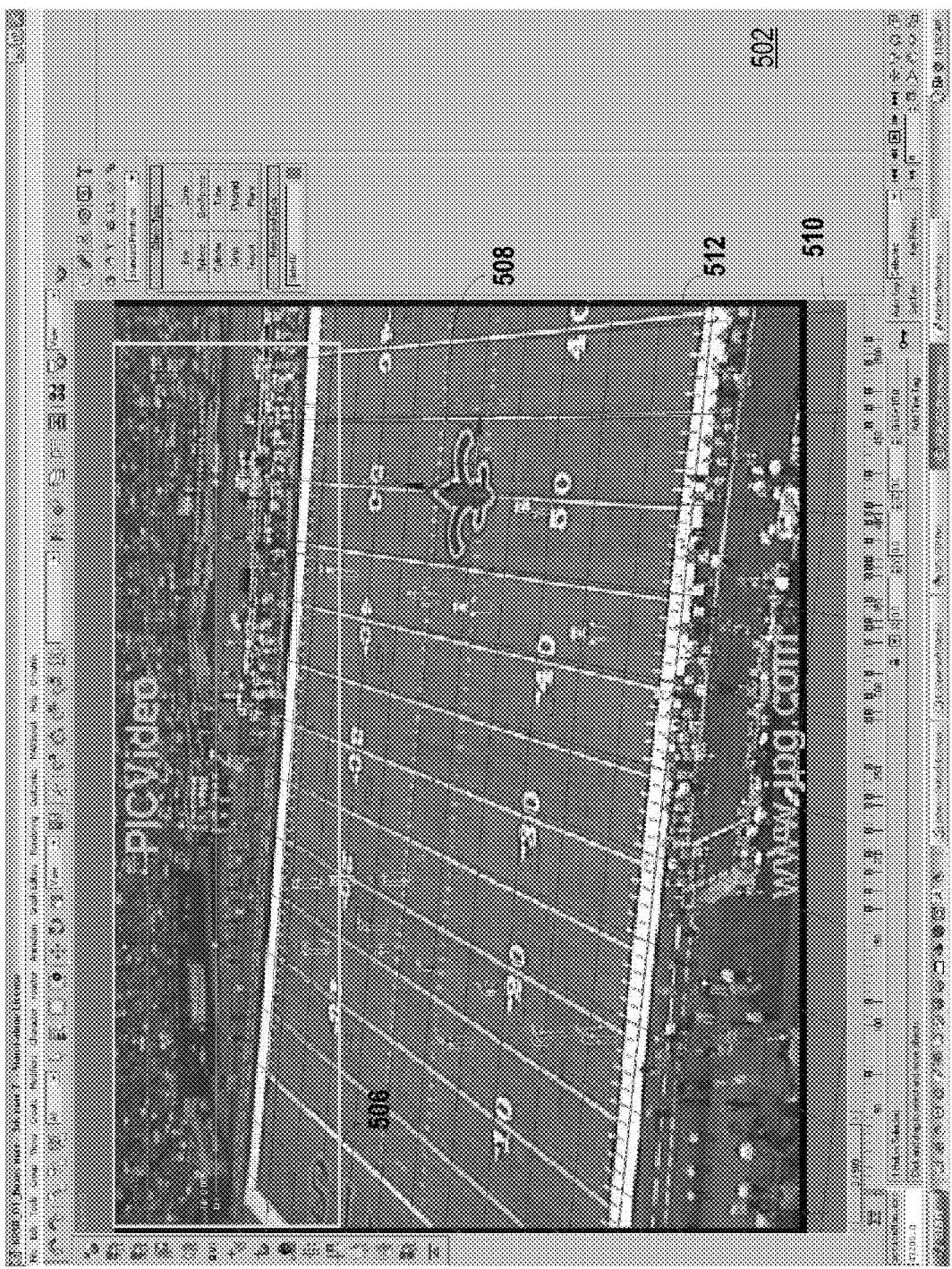
FIG. 5 depicts an exemplary embodiment an exemplary screen shot of an exemplary GUI of an exemplary 3D animation environment showing an exemplary make sliders script tool icon used to create an exemplary group of three (3) sliders, one for yaw, one for pitch, and one for zoom, which may be used in an exemplary embodiment, to superimpose a grid over a frame of video, by animating, to estimate a match of what the video camera's movements were according to an exemplary embodiment of present invention.

FIG. 5 depicts an exemplary embodiment an exemplary screen shot 500 of an exemplary GUI of an exemplary 3D animation environment 502 showing an exemplary make sliders script tool 506 icon used to create an exemplary group of three (3) sliders 508, one for yaw, one for pitch, and one for zoom, which may be used in an exemplary embodiment, to superimpose a two-dimensional or three-dimensional grid 510 over a given frame 512 of video, by animating, to estimate a match of what the video camera's movements were according to an exemplary embodiment of present invention. By matching the grid 510 to the scene in the video image, a virtual camera may estimate in what way the camera moved. The exemplary tool recognizes that the camera used in a football game is not mobile. In the event of a moving camera, such as, e.g., an over the field moving camera, then the tool must further extrapolate camera movements in any other degrees of possible motion. As will be apparent to those skilled in the art, other methods of camera matching may be employed within the scope of this invention. Exemplary methods of camera matching may alternatively include a brute force method of calculating camera movement, a software application, a motion tracking process, an automated camera location generating process, a radio frequency identifier (RFID) capable of determining a location of an object in motion, a global positioning system (GPS) positioning system of determining a location of an object in motion, a camera based system for determining a location of an object in motion; and/or georeferencing a location of an object in motion. Any of various well known motion tracking systems may be used to complement the present invention. An exemplary sensor based motion tracking system is described in U.S. Pat. No. 6,831,603, the contents of which is incorporated herein by reference in its entirety. An exemplary location tracking system using, a radio frequency (RF) and/or GPS system is described in U.S. Pat. No. 6,677,858, the contents of which are incorporated herein by reference in their entirety. Another motion tracking system is described in U.S. Pat. No. 6,784,826, the contents of which are incorporated herein by reference in their entirety. A realtime acquisition system for tracking people in motion using cameras is described in U.S. Pat. No. 5,513,854, the contents of which are incorporated herein by reference in their entirety. A system for tracking motion of several objects in a predefined XY area is described in U.S. Pat. No. 6,707,487, the contents of which are incorporated herein by reference in their entirety. Also, a body motion detection system which may be used to correct for tilt, using accelerometers is disclosed in U.S. Pat. No. 6,590,536, the contents of which are incorporated herein by reference in their entirety.

Figure 6:
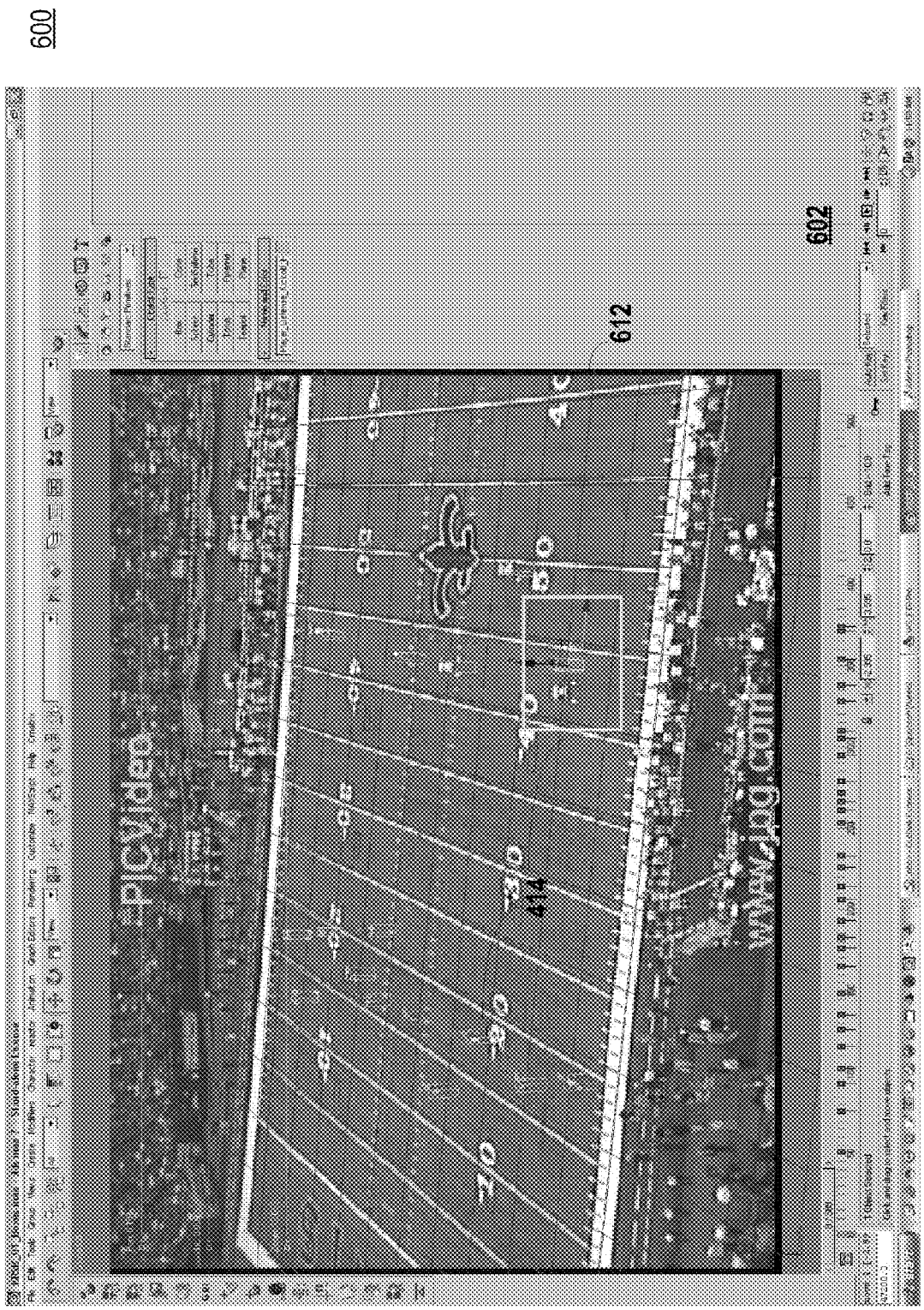
FIG. 6 depicts an exemplary embodiment an exemplary screen shot of an exemplary GUI of an exemplary 3D animation environment showing an exemplary initial set up used to move all the extruded pentagon boxes so that they start out over top of each player in the exemplary frame according to an exemplary embodiment of present invention.

FIG. 6 depicts an exemplary embodiment an exemplary screen shot 600 of an exemplary GUI of an exemplary 3D animation environment 602 showing an exemplary initial set up used to move all the extruded pentagon boxes 414 so that they start out over top of each player pictured in an exemplary video frame 612 according to an exemplary embodiment of present invention.

Figure 7:
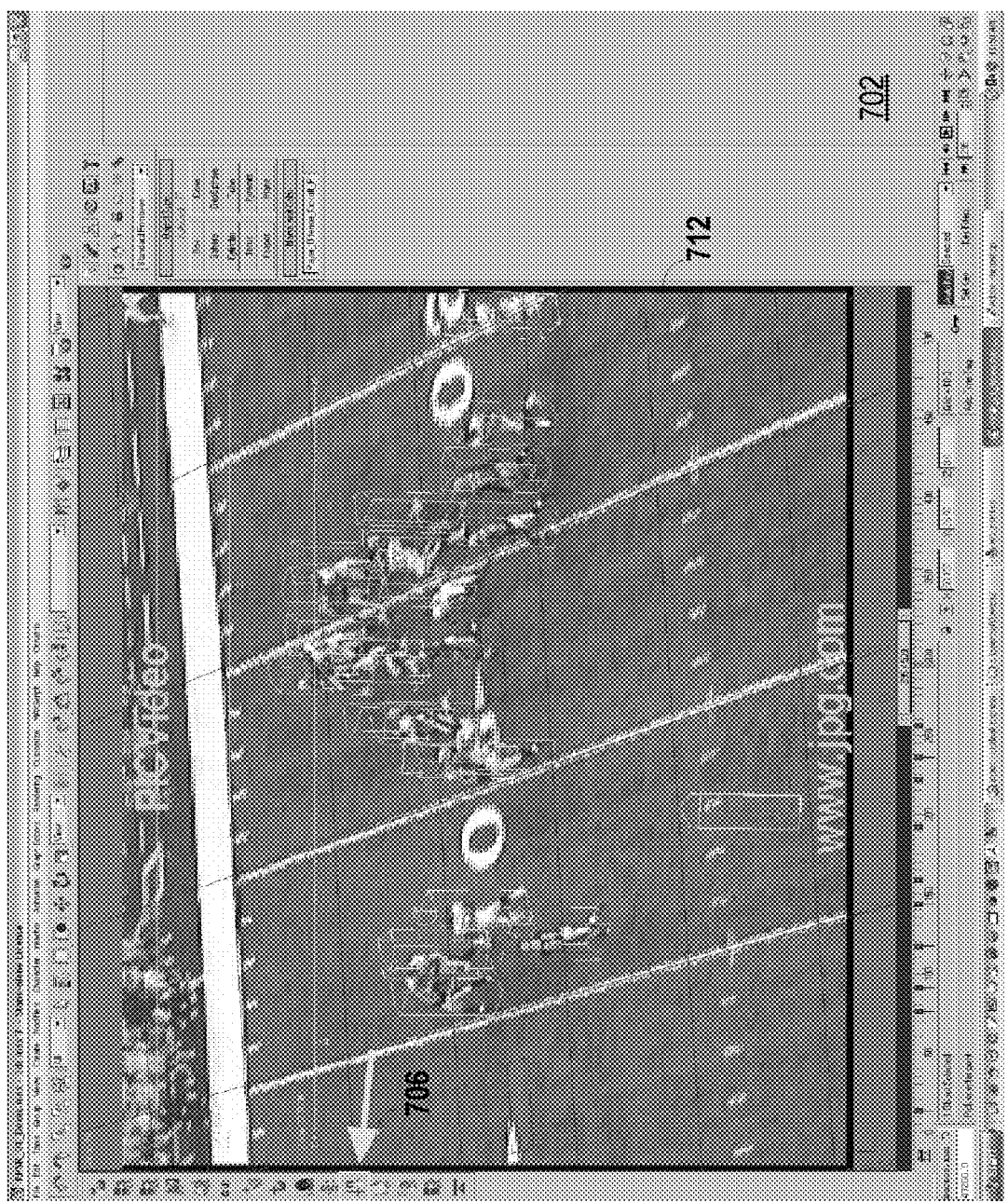
FIG. 7 depicts an exemplary embodiment an exemplary screen shot of an exemplary GUI of an exemplary 3D animation environment showing an exemplary block out tool which may be used to scrub video footage, move, and rotate extruded polygons very quickly, which may be done for each player, for each frame, start to finish according to an exemplary embodiment of present invention.

FIG. 7 depicts an exemplary embodiment an exemplary screen shot 700 of an exemplary GUI of an exemplary 3D animation environment 702 showing an exemplary block out tool 706 which may be used to scrub video footage, move, and rotate extruded polygons very quickly. In an exemplary embodiment, the video footage may be scrubbed for each player, for each frame, from the start to finish of a play, according to an exemplary embodiment of present invention. As will be apparent to those skilled in the art, full motion video may include approximately 30 frames per second of video. In an exemplary embodiment boxes 414 may be placed on the location of a player. In an exemplary embodiment, the boxes 414 may be shaped like an extruded homeplate shaped pentagon, with the point indicating the direction of movement and the location of the box 414 indicating the present location of the moving object in the frame.

Figure 8:
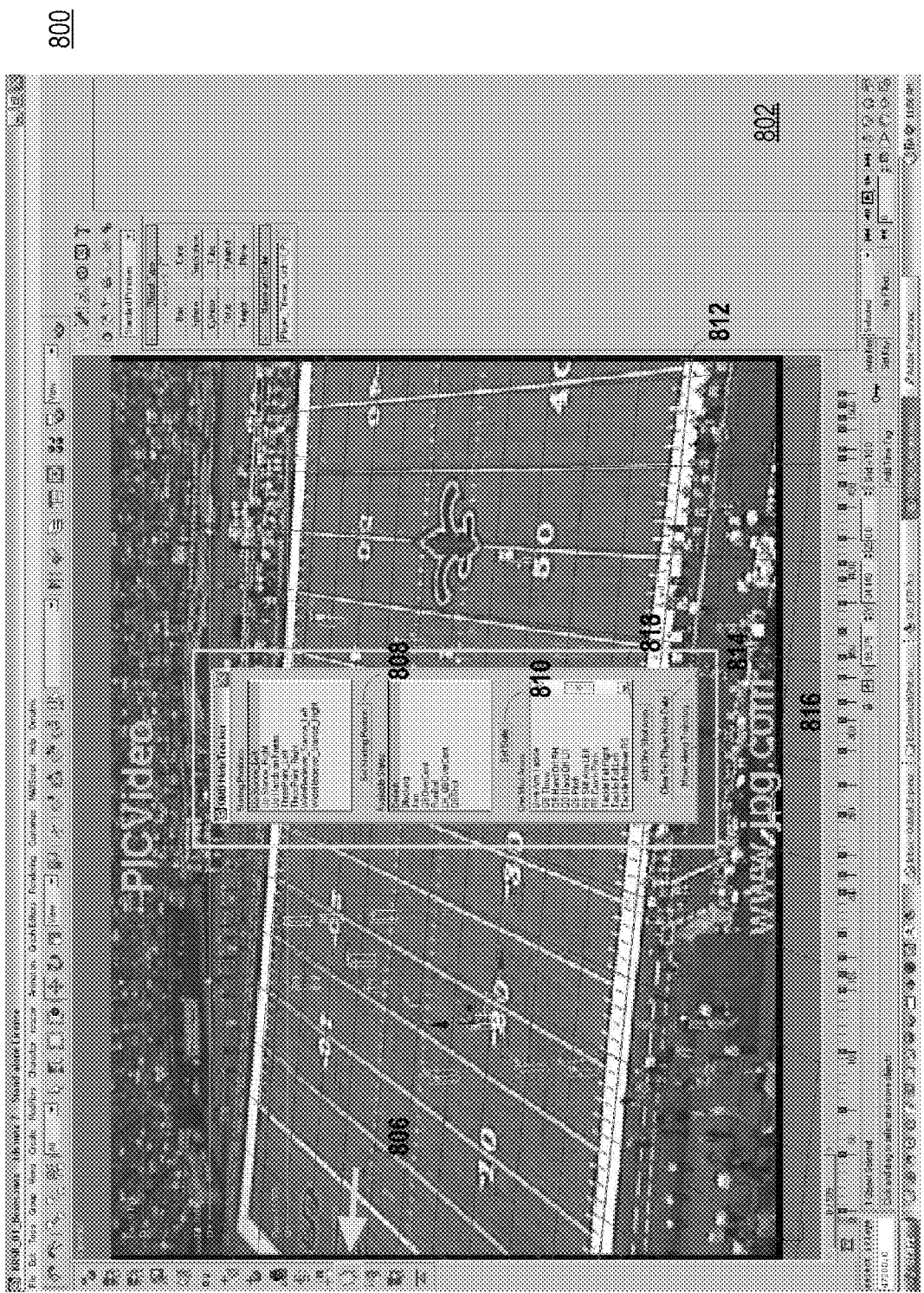
FIG. 8 depicts an exemplary embodiment an exemplary screen shot of an exemplary GUI of an exemplary 3D animation environment showing an exemplary setting state tool which may be used to set a state, which may be used when a player begins a new action such as, e.g., blocking, running, and/or catching, where exemplary states may include, a starting position, a state, and/or a one shot animation for a discrete time event, according to an exemplary embodiment of present invention.

FIG. 8 depicts an exemplary embodiment an exemplary screen shot 800 of an exemplary GUI of an exemplary 3D animation environment 802 showing an exemplary setting state tool 806 which may be used to set a state. In an exemplary embodiment, the state selected may be used to annotate a player's movement, and the selected state may be used when later generating an animation of the player's movement. In an exemplary embodiment, when a player begins a new action such as, e.g., but not limited to, blocking, running, and/or catching, the type of movement may be annotated. Some exemplary states and related metadata may include, e.g., but not limited to, a starting position 808, a state 810, and/or a one shot animation 818 for a discrete time event, or the like, according to an exemplary embodiment of present invention.

In an exemplary embodiment, starting positions may be selected using button 808. In an exemplary embodiment, there may be a default, and a user may vary from the default by interacting with the GUI. In an exemplary embodiment, starting positions may be selected from a list of generally expected starting positions. In one exemplary embodiment, a software agent may analyze video to suggest a starting position for the various motion objects. In the football example, in an exemplary embodiment, the starting positions may include, e.g., but are not limited to, up stance left, up stance right, up hands on knees, three point stance left, three point stance right, wide receiver stance left, and wide receiver stance right. As will be apparent to those skilled in the art, starting positions may be optional, but may be used to provide efficiency in animation recreation by adding robust data to the animation engine to obtain as realistic a recreation of the video captured event as possible, without requiring frame by frame full character animation.

In an exemplary embodiment, setting state may be selected using button 810. In an exemplary embodiment, there may be a default state for a given position. In an exemplary embodiment, a user may vary from the default state by interacting with the GUI. In an exemplary embodiment, the state may be selected from a list of generally expected states, where each position may have a relevant list of expected states that generally arise. In one exemplary embodiment, a software agent may analyze video to suggest a state for the various motion objects. In the football example, in an exemplary embodiment, the states available may vary by position. In an exemplary position, the states may include, e.g., but are not limited to, blocking, jam, quarterback (QB) over center, running ball, a left handed QB over center, and a QB shot. As will be apparent to those skilled in the art, states may be optional, but may be used to provide efficiency in animation recreation by adding robust data to the animation engine to obtain as realistic a recreation of the video captured event as possible, without requiring frame by frame full character animation.

In an exemplary embodiment, one shot animations may be selected using selection button 818. In an exemplary embodiment, there may be a default one shot animation which may be selected when a one shot animation selection 812 is selected, and a user may vary from the default by interacting with the GUI. In an exemplary embodiment, one shot animations may capture discrete time events. An exemplary one shot animation may be selected from a list of generally expected one shot animations. In one exemplary embodiment, a software agent may analyze video to suggest a one shot animation for a particular frame, and/or the various motion objects in the frame. In the football example, in an exemplary embodiment, the one shot animations may include, e.g., but are not limited to, drive arm tackle, quarterback (QB) throw, QB Handoff right handed, QB handoff left handed, QB pitch, running back (RB) stiff arm left, RB catch pitch, tackle fall right, tackle fall left, tackle rollover right side (RS), Center Snap, Catch Med, Catch Over Shoulder, Catch Low, Catch High, Dive Catch, Dive Forward, Dive Arm Tackle, QB Throw, QB Hand Off RH, QB Hand Off LH, QB Pitch, RB Stiff Arm Left, RB Catch Pitch, Tackle Fall Right, Tackle Fall Left, Tackle Rollover RS, Tackle Rollover, Tackled Front, Throw Deep Tackled Back, Punt Catch, Kickoff, Punt, Point Left, Point Right, QB Shot Catch, Tackle Back, Tackle Back Left, Tackle Back Right, Tackle Front, Tackle Front Left, Tackle Front Right, Stiff Arm Left, Stiff Arm Right, Push Off Straight, Push Off Left, Push Off Right, QB Pitch Left, QB Pitch Right, and/or Lay Flat, etc. Other exemplary one shot animations may include discrete time events such as, e.g., but not limited to, a kickoff, a punt, an extra point, an attempted field goal, etc.

As will be apparent to those skilled in the art, one shot animations may be optional, but may be used to provide efficiency in animation recreation by adding robust data to the animation engine to obtain as realistic a recreation of the video captured event as possible, without requiring frame by frame full character animation.

Button 814 may be used to clear annotations associated with a given player.

Button 816 may be used to have a player move along a trajectory. In an exemplary embodiment, the trajectory may be calculated based on the recent relative movement of the player, and an estimate of player location may be extrapolated, and then the extrapolated estimate may be compared to the position of the player in the ensuing frame, and may be corrected by user intervention, or software agent.

Thus, extensive artificial intelligence based, expert system based knowledge may be used, according to exemplary embodiments of the present invention, to make the 3D animation of moving objects in video more efficient. Using some of the exemplary methods of the present invention, the time to create a 3D animation of a play can improve from 30 hours to create a 3D animation of a play from frame-by-frame animation (placing a mannequin or stick figure over a player location, manipulating the mannequin in position, advancing a frame and repeating mannequin placement), to a much more efficient process of the present invention, a couple hour process, to obtain a reasonably accurate 3D animation representation (by selecting from a bucket or repository of preset customizable animations).

The pre-set animations may include blendable weights for such characteristics of the animation as running/walking/limping, protecting ball, back peddaling, throwing, tucking a ball. In an exemplary embodiment, there may be 9 tracks per state of blendable weights. A user may use features of the 3D animation environment, similar to a broadcast studio's mixing board, to mix blending of player motion. There may be a base layer of motion for an animation, and then based on settings, a mixing/damping/blending of animation settings may create a blended weight animation. Thus, the state settings, according to an exemplary embodiment of the present invention, may allow efficient, realistic 3D animated recreation of object movement observed in video.

Figure 9:
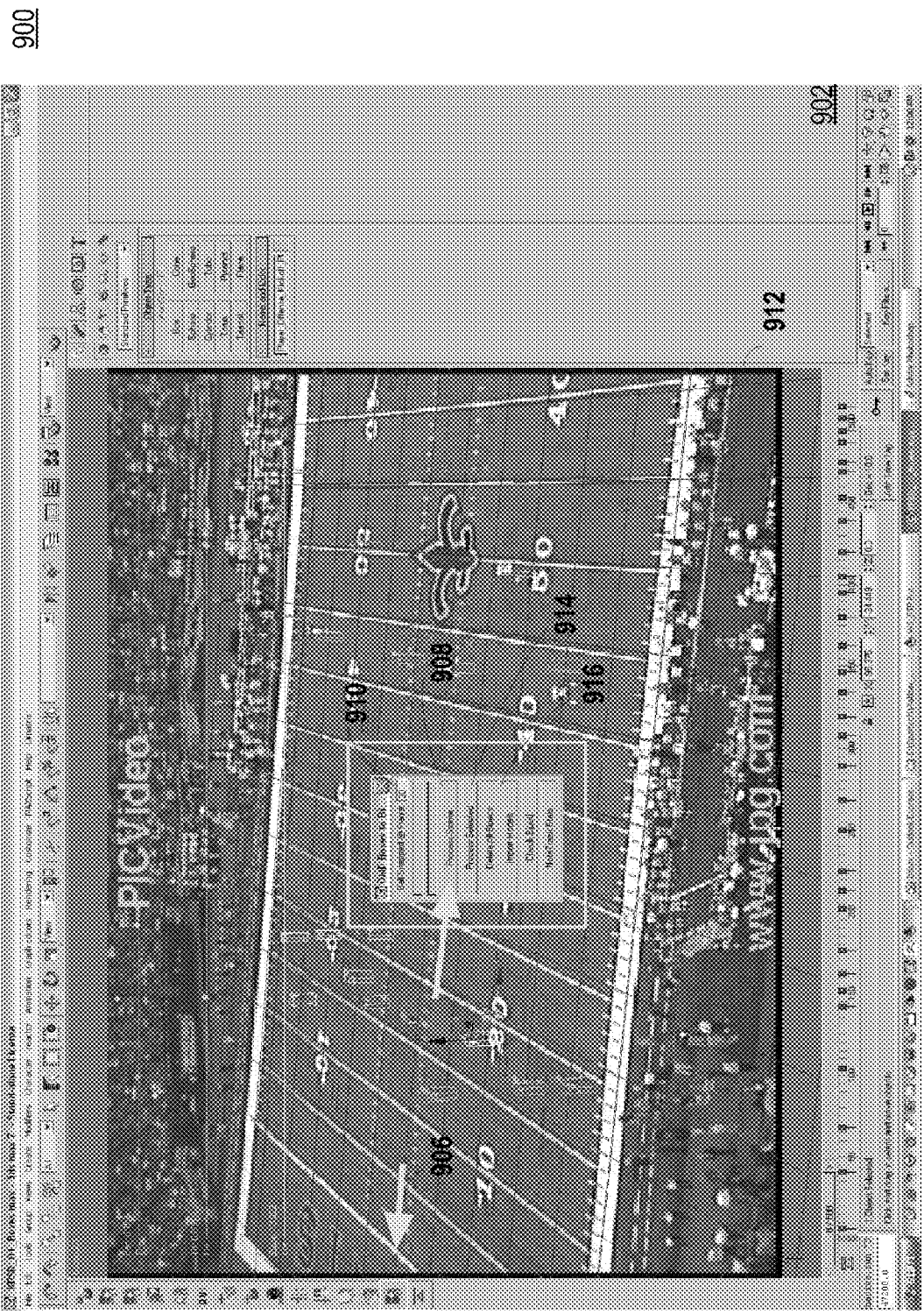
FIG. 9 depicts an exemplary embodiment an exemplary screen shot of an exemplary GUI of an exemplary 3D animation environment showing an exemplary automated script process scene tool which may be used to figure out which animation to play and when to play the animation for each of the extruded pentagons, which may occur after a frame number is entered for snap of the ball, according to an exemplary embodiment of present invention.

FIG. 9 depicts an exemplary embodiment an exemplary screen shot 900 of an exemplary GUI of an exemplary 3D animation environment 902 showing an exemplary automated script process scene tool 906 which may be used to figure out which animations to play and when to play the animations for each of the extruded pentagon boxes representing moving objects in video 912. In an exemplary embodiment, the scene may be processed as shown in 908. In an exemplary embodiment, scene processing may commence after a frame number is entered for snap of the ball, as illustrated at 910, according to an exemplary embodiment of present invention. However, alternative methods of scene animation are possible according to other exemplary embodiments of the present invention. For each of the 22 boxes 414, the animation application may select an appropriate animation from a library of preset animations, and using any metadata about the box 414, provided, including, e.g., starting position, state, and/or one shot animations, and related criterion settings. According to an exemplary embodiment, the scene may be processed, the process may be selected 914, and/or the BIPEDs may be deleted 916. Blending between animations may be calculated, weightings may be considered.

Figure 10:
FIG. 10 depicts an exemplary embodiment an exemplary screen shot of an exemplary GUI of an exemplary 3D animation environment showing an exemplary importing of models tool which may be used to replace the extruded pentagons with 3D characters where each character has the proper animations, according to an exemplary embodiment of present invention.

FIG. 10 depicts an exemplary embodiment an exemplary screen shot 1000 of an exemplary GUI of an exemplary 3D animation environment 1002 showing an exemplary importing of models tool 1006. Tool 1006 may be used to replace the extruded pentagons with 3D animated characters where each character has the proper animations as required by the metadata provided about the character (such as, e.g., but not limited to, starting position, state, and/or one shot animation), according to an exemplary embodiment of present invention. In one exemplary embodiment, at the conclusion of animation creationg, the video may be removed and the animation may be represented in the 3D environment as illustrated in FIG. 11.

Figure 11:
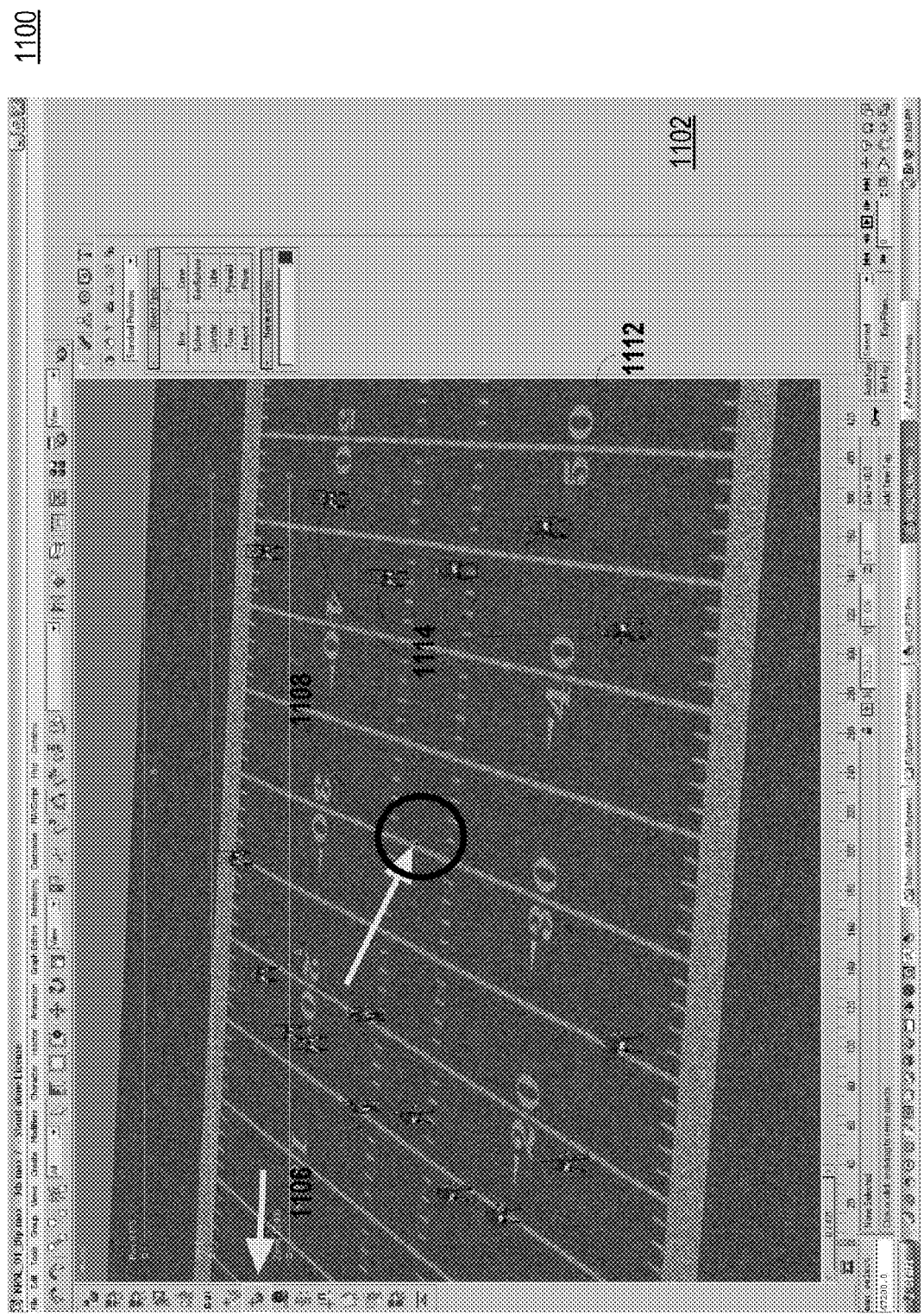
FIG. 11 depicts an exemplary embodiment an exemplary screen shot of an exemplary GUI of an exemplary 3D animation environment showing an exemplary add ball tool which may be used to add a ball to the animated scene, according to an exemplary embodiment of present invention.

FIG. 11 depicts an exemplary embodiment an exemplary screen shot 1100 of an exemplary GUI of an exemplary 3D animation environment 1102 showing an exemplary add ball tool 1106 which may be used to add a ball 1108 to the animated scene 1112 including animated player characters 1114, according to an exemplary embodiment of present invention.

Figure 12:
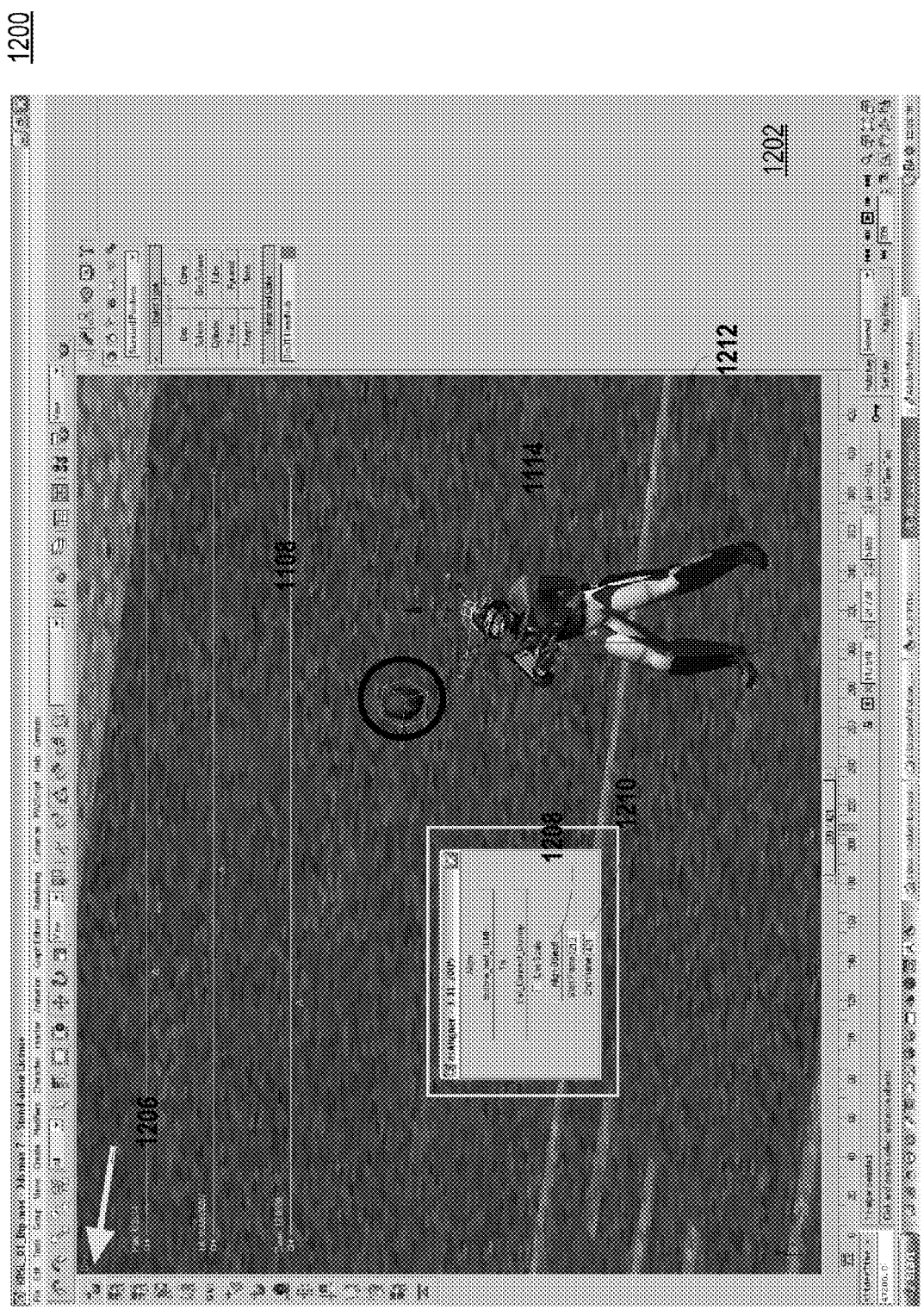
FIG. 12 depicts an exemplary embodiment an exemplary screen shot of an exemplary GUI of an exemplary 3D animation environment showing an exemplary attaching ball tool which may be used to attach a ball to a player, according to an exemplary embodiment of present invention.

FIG. 12 depicts an exemplary embodiment an exemplary screen shot 1200 of an exemplary GUI of an exemplary 3D animation environment 1202 showing an exemplary attaching ball tool 1206, which may be used to attach a ball to an animated player character 1114, according to an exemplary embodiment of present invention. Since a football has a resilient shape, a software agent may be used to align the moving ball object 1208, according to an exemplary embodiment. In an exemplary embodiment, the start and end frame of an animation sequence may be provided 1210, and then the animation may be aligned 1210.

Figure 13:
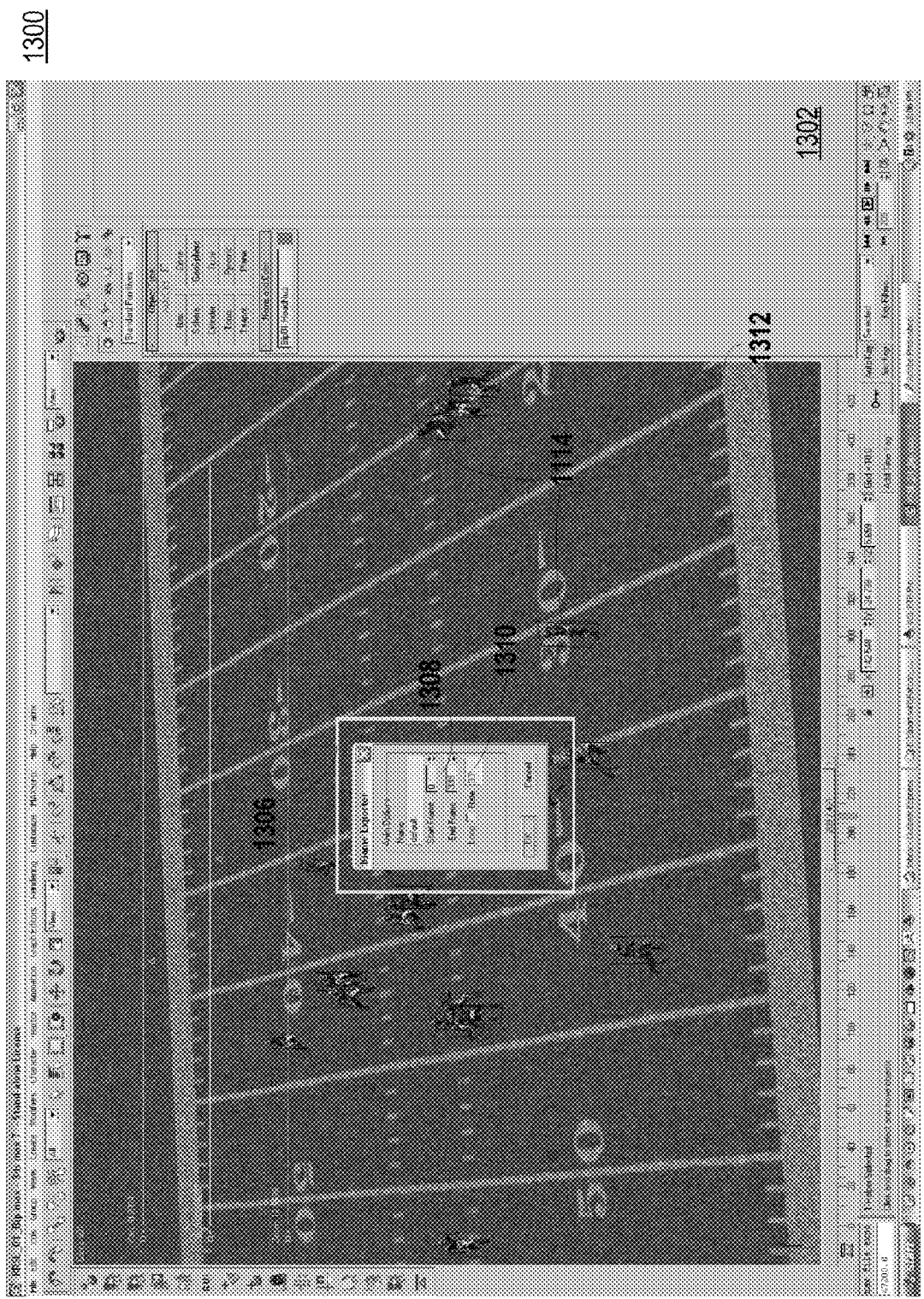
FIG. 13 depicts an exemplary embodiment an exemplary screen shot of an exemplary GUI of an exemplary 3D animation environment showing an exemplary 3D animation exporter, which may be used to export an animated play including a group of consecutive frames of animation, according to an exemplary embodiment of present invention.

FIG. 13 depicts an exemplary embodiment an exemplary screen shot 1300 of an exemplary GUI of an exemplary 3D animation environment 1302 showing an exemplary 3D animation exporter 1306, which may be used to export an animated play including a group of user selectable consecutive frames of animation 1308, at a particular animation rate 1310 such as, e.g., but not limited to, 30 frames per second (fps) according to an exemplary embodiment of present invention.

Figure 14:
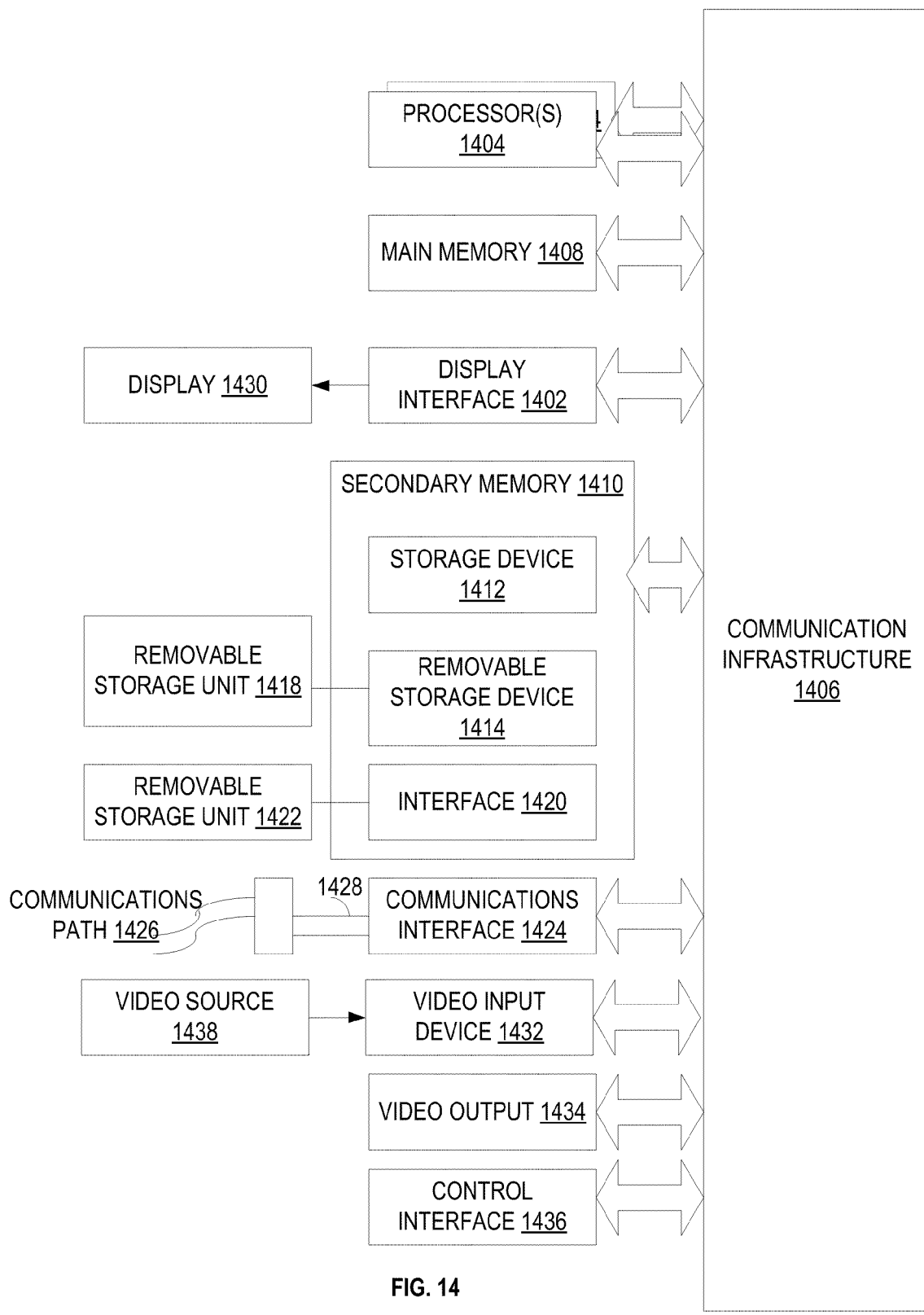
FIG. 14 depicts an exemplary embodiment a computer system as may be used to execute software application programs according to an exemplary embodiment of present invention.

FIG. 14 depicts an exemplary embodiment a computer system 1400 as may be used to execute software application programs according to an exemplary embodiment of present invention. Computer system 1400 is discussed further below under the section entitled "An Exemplary Computing System Environment."

An Exemplary 3D Animation Software Environment

In an exemplary embodiment of the present invention, an exemplary system may be included as an extension to a 3D video application software environment. In an exemplary embodiment, the 3D video application environment may be included as extensions to an off the shelf 3D video software application environment named AUTODESK® 3ds Max® 8 software, available from Autodesk, Inc., 111 McInnis Parkway, San Rafael, Calif. 94903, USA. Autodesk® 3ds Max® 8 software delivers flexible, productive tools designed for 3D artists in many industries—game development, design visualization, and visual effects, and provides asset management, character development, UV mapping, and scripting tools.

Animation features allow a user to mix, edit, and transition motions from any 3ds Max animation. The product allows import of standard motion capture formats directly to a character rig. The product allows use of an open file format based on XML to allow writing motion files from custom tools and bringing them into 3ds Max. Photorealistic characters may be developed using character development features, cloth and hair simulation tools, a Reactor® physics system, and particle flow.

Modeling features provide polygon tools for low- or high-resolution modeling. Polygon modeling tools accelerate the process of adding detail to geometry. Edit Poly allows creating simple to complex models.

UV Mapping Tools allow users to control unfolding of UV seams with pelt mapping. Users can create a flat, unified map for texturing objects by stretching out UVW coordinates. Users can relax UVs and remove distortion by accurately matching UVs to object geometry.

Skinning features allow a user to skin anything from low polygon, high-quality game meshes to dense visual effects models. Vertices may be assigned to a bone by default to prevent unwanted stretching and minimize the need to edit envelopes.

Maxscript Scripting Language features allow a user to build solid Maxscripts with a Maxscript debugger. The user can add custom functionality into tools with control over the user interface. Users may use the object-oriented scripting language to create scripts to extend the 3ds Max toolset, or to optimize workflow throughout a pipeline.

Asset management features allow a user to share, control, and manage work-in-progress assets using asset Tracker, a source control solution compatible with existing asset management solutions.

Character development features allow a user to create realistic models with industry-leading polygon editing tools. Pelt mapping and relax tools may be used to reduce time spent fine-tuning UV Maps. The Motion Mixer tool allows a user to craft and refine any 3ds Max animation, thus non-linear animation mixing is no longer for Biped® functionality only.

Development tools features allow a user to build solid Maxscripts in less time using a Maxscript debugger. The development tools may be used to create custom solutions and plug-ins with a Software Development Kit (SDK).

Performance features provide stability and performance to a 3D artist. Edit Poly selection options, improved Trackview performance, and increased character rigging and skinning interactivity enhance performance.

An Exemplary Computing System Environment

FIG. 14 depicts an exemplary embodiment of a computer system that may be used in computing devices such as, e.g., but not limited to, client or server devices according to an exemplary embodiment of the present invention. FIG. 14 depicts an exemplary embodiment of a computer system that may be used as client device 102, or a server device 104, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 1400 is shown in FIG. 14, depicting an exemplary embodiment of a block diagram of an exemplary computer system useful for implementing the present invention. Specifically, FIG. 14 illustrates an example computer 1400, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/,etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 1400 is shown in FIG. 14. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 14.

The computer system 1400 may include one or more processors, such as, e.g., but not limited to, processor(s) 1404. The processor(s) 1404 may be connected to a communication infrastructure 1406 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 1400 may include a display interface 1402 that may forward, e.g., but not limited to, graphics, text, and other data, etc., from the communication infrastructure 1406 (or from a frame buffer, etc., not shown) for display on the display unit 1430. Further, the computer system 1400 may include a video input device 1432, a video output device 1434, and/or a control interface 1436, according to an exemplary embodiment.

The computer system 1400 may also include, e.g., but may not be limited to, a main memory 1408, random access memory (RAM), and a secondary memory 1410, etc. The secondary memory 1410 may include, for example, (but not limited to) a hard disk drive 1412 and/or a removable storage drive 1414, representing a floppy diskette drive, a magnetic tape drive, an optical disk drive, a compact disk drive CD-ROM, etc. The removable storage drive 1414 may, e.g., but not limited to, read from and/or write to a removable storage unit 1418 in a well known manner. Removable storage unit 1418, also called a program storage device or a computer program product, may represent, e.g., but not limited to, a floppy disk, magnetic tape, optical disk, compact disk, etc. which may be read from and written to by removable storage drive 1414. As will be appreciated, the removable storage unit 1418 may include a computer usable storage medium having stored therein computer software and/or data.

In alternative exemplary embodiments, secondary memory 1410 may include other similar devices for allowing computer programs or other instructions to be loaded into computer system 1400. Such devices may include, for example, a removable storage unit 1422 and an interface 1420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 1422 and interfaces 1420, which may allow software and data to be transferred from the removable storage unit 1422 to computer system 1400.

Computer 1400 may also include an input device such as, e.g., (but not limited to) a mouse or other pointing device such as a digitizer, and a keyboard or other data entry device (none of which are labeled).

Computer 1400 may also include output devices, such as, e.g., (but not limited to) display 1430, and display interface 1402. Computer 1400 may include input/output (I/O) devices such as, e.g., (but not limited to) communications interface 1424, cable 1428 and communications path 1426, etc. These devices may include, e.g., but not limited to, a network interface card, and modems (neither are labeled). Communications interface 1424 may allow software and data to be transferred between computer system 1400 and external devices. Examples of communications interface 1424 may include, e.g., but may not be limited to, a modem, a network interface (such as, e.g., an Ethernet card), a communications port, a Personal Computer Memory Card International Association (PCMCIA) slot and card, etc. Software and data transferred via communications interface 1424 may be in the form of signals 1428 which may be electronic, electromagnetic, optical or other signals capable of being received by communications interface 1424. These signals 1428 may be provided to communications interface 1424 via, e.g., but not limited to, a communications path 1426(e.g., but not limited to,a channel). This channel 1426 may carry signals 1428, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 1414, a hard disk installed in hard disk drive 1412, and signals 1428, etc. These computer program products may provide software to computer system 1400. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; and others.

Computer programs (also called computer control logic), may include object oriented computer programs, and may be stored in main memory 1408 and/or the secondary memory 1410 and/or removable storage units 1414, also called computer program products. Such computer programs, when executed, may enable the computer system 1400 to perform the features of the present invention as discussed herein. In particular, the computer programs, when executed, may enable the processor 1404 to provide a method to resolve conflicts during data synchronization according to an exemplary embodiment of the present invention. Accordingly, such computer programs may represent controllers of the computer system 1400.

In another exemplary embodiment, the invention may be directed to a computer program product including a computer readable medium having control logic (computer software) stored therein. The control logic, when executed by the processor 1404, may cause the processor 1404 to perform the functions of the invention as described herein. In another exemplary embodiment where the invention may be implemented using software, the software may be stored in a computer program product and loaded into computer system 1400 using, e.g., but not limited to, removable storage drive 1414, hard drive 1412 or communications interface 1424, etc. The control logic (software), when executed by the processor 1404, may cause the processor 1404 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

In another exemplary embodiment, the invention may be used to provide an enhanced online gametracker. Conventional online gametrackers may be thought of as glorified scoreboards. Conventional gametrackers provide only very limited information about the game.

No matter the sport, online gametrackers all display real-time updates of box score statistics, immediately after-the fact, or shortly after the fact descriptions of the preceding play/pitch/shot, and a very basic, conventionally 2-D representation of the field of play.

In the case of American football, for example, the on-field action is represented by a line which shows the progress of the offense, the current down marker, and may show the distance or have a line representing the next $1^{st}$ and 10.

Baseball gametrackers display the position of any on-base runners, and CBS Sportsline's baseball gametracker has a separate window with a picture of the strike zone, with each pitch in the at-bat being represented by a dot put on or outside the strike zone depending on where the pitch crossed home plate.

Basketball gametrackers use a 2-D basketball court as a pictorial shot chart, with each shot taken having its position indicated on the 2-D court. Generally, a shot indicated by an X may mean the shot was missed while an O may mean the shot was made.

Soccer gametrackers have very little information and have limited usability, since there are few statistics and few discrete events to mark on a 2-D field.

Figure 15:
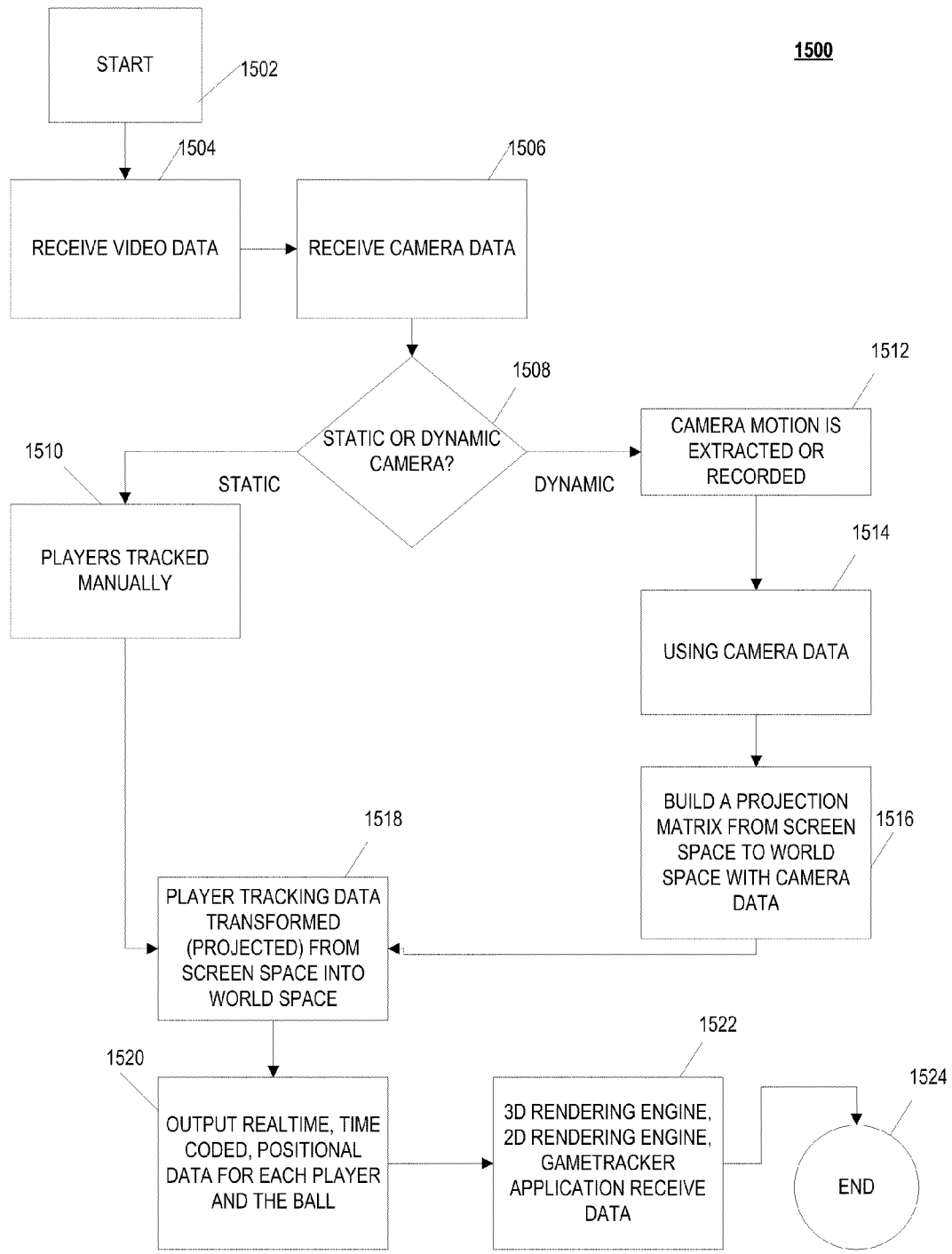
FIG. 15 depicts an exemplary flow diagram illustrating an exemplary embodiment of a realtime game information processing system—game information available realtime (GIAR)

According to another exemplary embodiment, a game information available realtime (GIAR) process, as depicted in FIG. 15 may be used to generate realtime, time coded, positional data for players and/or the ball.

FIG. 15 depicts an exemplary flow diagram 1500 illustrating an exemplary embodiment of a realtime game information processing system—game information available realtime (GIAR).

Flow diagram 1500 may begin with 1502 and may continue immediately with 1504.

In 1504, flow diagram 1500 may receive video data. From 1504, flow diagram 1500 may continue with 1506.

In 1506, flow diagram 1500 may receive camera data. From 1506, flow diagram 1500 may continue with 1508.

In 1508, flow diagram 1500 may determine whether the camera is static or dynamic. If the camera is determined to be static, then flow diagram 1500 may continue with 1510. If the camera is determined to be dynamic, then flow diagram 1500 may continue with 1512.

In 1510, players may be tracked manually. From 1512, flow diagram 1500 may continue with 1518.

In 1518, player tracking data may be transformed (projected) from screen space into world space. From 1518, flow diagram 1500 may continue with 1520.

In 1512, camera motion may be extracted or recorded from the dynamic camera. From 1512, flow diagram 1500 may continue with 1514.

In 1514, camera data may be used. From 1514, flow diagram 1500 may continue with 1516.

In 1516, a projection matrix may be built from screen space to world space with the camera data. From 1516, flow diagram 1500 may continue with 1518.

In 1520, realtime, time coded, positional data for each player and/or the ball may be output. From 1520, flow diagram 1500 may continue with 1522.

In 1522, the data of 1520 may be input into a 3D rendering engine, a 2D rendering engine, and/or a gametracker application. The data may further be coupled with other applications, such as, television programming, online content, fantasy content, etc. From 1522, flow diagram 1500 may continue with 1524, which may immediately end.

According to one exemplary embodiment, enhanced online gametracking may be provided by providing player tracking in realtime, or close to realtime.

According to one exemplary embodiment, for an example of a football game with 11 players to a team, 22 or 23 workers may be in one or more rooms, all watching the game in realtime. The workers may each track a specific player, or the ball. In one exemplary embodiment, if the location of the ball is tracked by whomever is touching the ball. The workers may all be watching the game on a single screen, each on their own screen, or something in between, such as, e.g., a group of workers sharing one viewing angle such as, e.g., but not limited to, the offense viewing one depiction, and the defense viewing another depiction, for example. According to one exemplary embodiment, the game footage may be shown from a static camera angle—this may either be because it was shot from a static camera, or it could be from a moving camera, which may be rectified in real-time (i.e., the motion, rotation, and zoom may be removed, using camera information gained using the ways described herein). The video footage could also be shot from multiple cameras and could be stitched together, according to another exemplary embodiment. According to another exemplary embodiment, moving camera data could be used, without rectification, as long as the workers are provided information such as that provided by, e.g., an instrumented camera.

According to an exemplary embodiment, the workers may capture information about players, perhaps with additional metadata about the players movement. In one exemplary embodiment, less data is captured than is described in other exemplary embodiments, to achieve a closer to realtime enhanced gametracking data stream.

According to an exemplary embodiment, the input to the GIAR process or system may be essentially a subset of what the video to 3D animation embodiments capture, i.e., video from certain places, and some camera information.

According to an exemplary embodiment, each worker may control a cursor, and may be responsible for keeping that cursor on top of a given player during the game. Meanwhile, according to an exemplary embodiment, all worker's positional data may be combined, and a datastream may be compiled of all player positions being tracked by the workers, to provide positional player data in near realtime to provided enhanced gametracking, etc.

In an exemplary embodiment, the workers may provide a real-time "block out" like the BoxesToBips system, but only inputting the positional data, i.e. no rotations.

According to an exemplary embodiment, the cursor data may then be projected onto the plane of the field, and given the fact that the cursors are already matched with players, the combined data provides real-time positional data on each player.

According to an exemplary embodiment, there may also be a few extra data entry personnel, who may manage things like who is carrying the ball, down and distance, etc. Depending on the sport being tracked, the numbers of player positions will of course vary, as well as other data which may be worthy of being tracked.

According to one exemplary embodiment, one exemplary, but non-limiting byproduct of the GIAR process and system may be a real-time gametracker—similar, but enhanced in comparison to the online gametrackers provided by www.yahoo.com and cbssportsline.com. According to an exemplary embodiment of the present invention, a realtime gametracker with far superior functionality and data may be provided, as conventional gametrackers can only have a line or helmet denoting the line of scrimmage, whereas an enhanced gametracker, according to an exemplary embodiment of the present invention, may have an icon for the position of where each player may be located in real-time.

Figure 16:
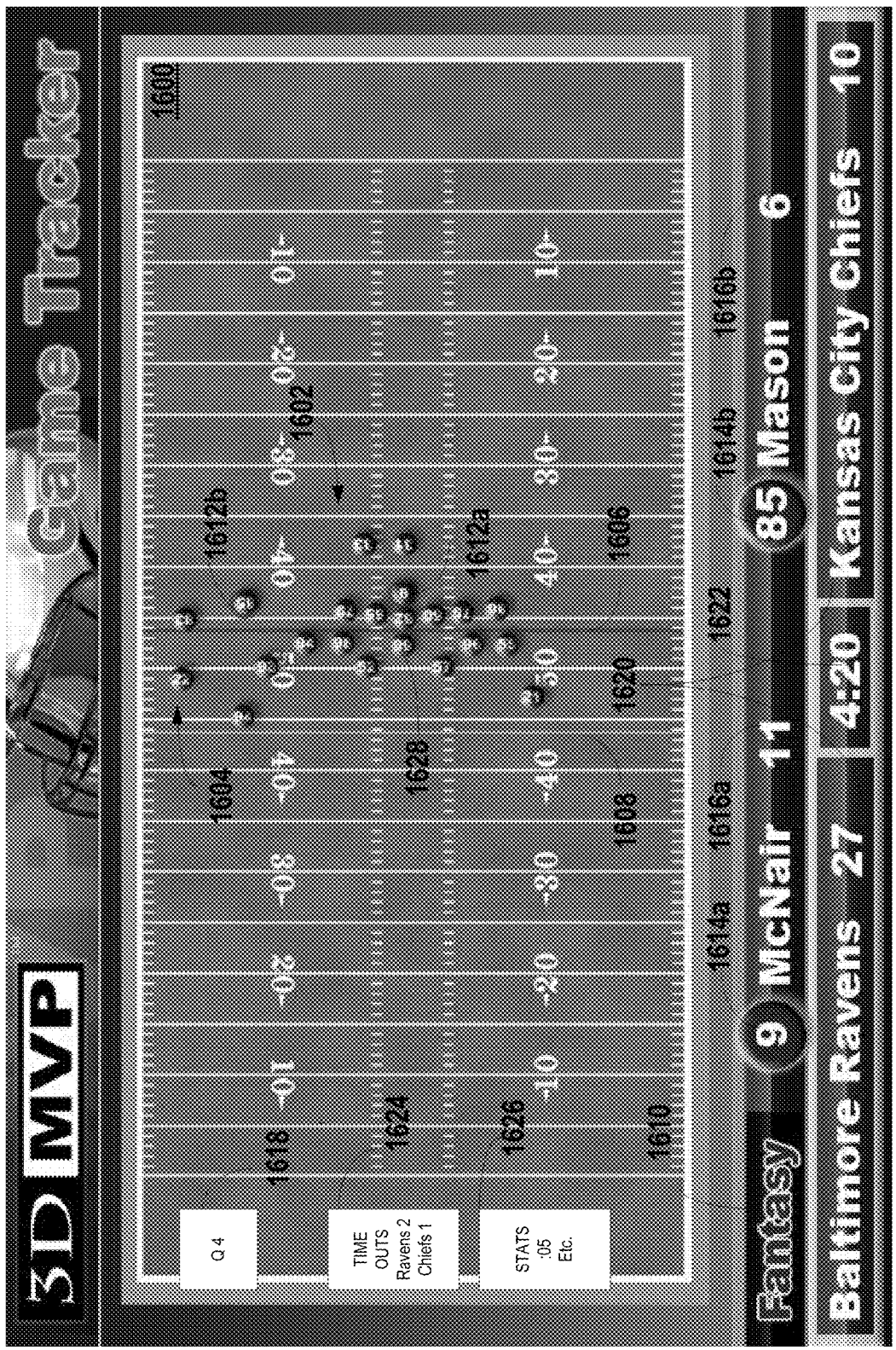
FIG. 16 depicts an exemplary embodiment of an exemplary online gametracker user interface as may be provided according to an exemplary embodiment of the present invention.

FIG. 16 depicts an exemplary embodiment of an exemplary screenshot 1600 illustrating an exemplary online gametracker user interface as may be provided according to an exemplary embodiment of the present invention.

The exemplary screenshot 1600, in an exemplary embodiment, may represent in realtime, the positions of the offensive players 1602 and defensive players 1604, as they stand at the line of scrimmage 1606, which may be represented by a blue line, in an exemplary embodiment, of an exemplary top view, two dimensional (2D) enhanced gametracker according to an exemplary embodiment, at the beginning of a play (i.e., with 5 seconds remaining on a play clock, see exemplary statistics 1626). In an exemplary embodiment, a yellow line 1608 may represent a first down marker. In another exemplary embodiment, other graphical representations may be used to represent, yards remaining to reach a first down, using color, etc. In one exemplary embodiment, when in a red zone, the first and goal space may be colored red, for example (not shown). In an exemplary embodiment, the blue line 1606 may represent the line of scrimmage. Offensive and Defensive players 1602 and 1604, respectively, may be represented by an avatar, in the exemplary embodiment, a geometric shape (e.g., a circle, a polygon, etc., or a 3D animated figure, etc.), which may be color coded to represent a team. In an exemplary embodiment, purple may be the team color of the team that happens to be on offense 1602, in the exemplary embodiment, the Baltimore Ravens. In the exemplary embodiment, the red may be the color of the team on defense 1602, in the exemplary embodiment, the Kansas City Chiefs. The numbers of the players may be represented on the player avatars, in this case, a 2D representation of a player. In another exemplary embodiment, the player avatar may be an animated 3D character. In one exemplary embodiment, the 2D representations of the player positions may be animated to show the movement of the players during a play, in near realtime. In an exemplary embodiment, a key or button may be pressed to advance through a play. In another exemplary embodiment, the gametracker may track the game play in near realtime with no advancement by the user. In another exemplary embodiment, pause and play buttons may be used to halt advancement of the gametracker, and the datastream may be stored so as to allow the viewer to resume viewing of the gametracker. In an exemplary embodiment, the player with the ball may be indicated by coloring that player differently, or by showing the player blinking, for example, in an exemplary embodiment. In another exemplary embodiment, a 3D avatar or animated 3D representation of players 1602, 1604 may be provided. According to one exemplary embodiment, intermediate positions of players 1628 may be calculated and interpolated or extrapolated between known, or datastream player position data. In an exemplary embodiment each player 1628 may have a number for identifying the player, and may have the 2D orientation made so as to help the viewer distinguish between an offensive and a defensive player. In an exemplary embodiment, the time on the clock 1622 may be representative of the state of the game, as shown, as may a quarter of the game 1618, other well known scoreboard information such as, e.g., but not limited to, Time outs remaining 1624, other statistics 1626, 25 second counters, etc., according to an exemplary embodiment. Advantageously, additional statistics may be calculated based on the datastream generated according to an exemplary embodiment, such as the speed of players, relative velocity, acceleration, etc. of a player compared between time portions of the game or event, etc.. In an exemplary embodiment, the current score 1620 at the time of the viewing of the gametracker, may be reflected.

As shown, in an exemplary embodiment, a user/viewer may choose to track a favorite player or players 1612a, 1612b. In an exemplary embodiment, a player's fantasy game participants may be tracked as favorite players 1612a, 1612b. According to an exemplary embodiment, the players 1612a, 1612b, being tracked may be colored red, or otherwise, so as to stand out (particularly dependent on the colors of the teams and player icons/avatars 1628.

According to an exemplary embodiment, the players being tracked may have statistics provided about their performance, in an exemplary embodiment, fantasy scores or fantasy points earned/value 1616a, 1616b may be provided, as well as the players player number 1614a, 1614b, for example. The viewer experience may be made to mirror, in as many ways as possible, a realworld stadium experience, in an exemplary embodiment. In one exemplary embodiment, the players may be animated in realtime to allow for a multiple window, or multiple screen experience, which may, in an exemplary embodiment, allow a user to follow the play from a bird's eye view, and/or the video play view.

Fantasy feature 1610, according to an exemplary embodiment, may use the realtime player position data stream, cross referenced against a viewer's fantasy team, to highlight a viewer's fantasy players, and fantasy score as described above with reference to FIG. 16, in an exemplary embodiment.

According to another exemplary embodiment, a viewer may track multiple games at one time by opening and viewing multiple gametrackers at the same time. In one exemplary embodiment, a viewer may view one game, while another game may be tracked in gametracker mode. According to one exemplary embodiment, a viewer may be provided a button or user interface icon to toggle between viewing a game's videom, and viewing the game in gametracker mode.

According to another exemplary embodiment, other data may be extrapolated from position and time, such as velocity, acceleration, distance traveled, average speed, etc. of players. According to an exemplary embodiment, the additional data may be used by coaches and analysts.

According to another exemplary embodiment, the GIAR process of FIG. 15 may also be used in conjunction with the actual video the data is taken from. According to an exemplary embodiment, a user may watch a game highlight in one video window and may in another window (which may be right next to it) see the GIAR representation of the highlight, which could provide full-field context to the video.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method of creating at least two dimensional (2D) data from video, comprising:
   receiving, by at least one computer, video information comprising a plurality of frames of digital video;
   receiving, by the at least one computer, metadata, said metadata relating to at least one object in motion in said digital video;
   creating, by the at least one computer, an animated and annotated boxes file based on said metadata;
   calculating, by the at least one computer, relative blend weights for movement animations of said at least one object in motion; and
   generating, by the at least one computer, at least 2D data from said animated and annotated boxes file and said relative blend weights.

2. The method according to claim 1, wherein said receiving, by the at least one computer, said metadata comprises:

receiving, by the at least one computer, said metadata from at least one of a person, an agent or a software agent.

3. The method according to claim 1, wherein said receiving said metadata comprises at least one of:
   receiving discrete event information about said object in motion,
   receiving ongoing event information about said object in motion,
   receiving movement information,
   receiving camera movement information;
   receiving camera pan/rotation/location/zoom information;
   receiving state information,
   receiving a starting position, or
   receiving an ending position.

4. The method according to claim 1, wherein said receiving said metadata comprises at least one of:
   receiving discrete event information about said object in motion, or
   receiving ongoing event information about said object in motion.

5. The method according to claim 1, wherein said receiving said metadata comprises at least one of:
   receiving discrete event information, or
   receiving a state of motion.

6. The method according to claim 5, wherein said receiving said metadata further comprises:
   receiving a starting position.

7. The method according to claim 1, further comprising:
   providing, by the at least one computer, for export of said at least two dimensional (2D) data.

8. The method according to claim 1, further comprising:
   providing, by the at least one computer, for rendering said at least two dimensional (2D) data.

9. The method according to claim 1, further comprising:
   providing, by the at least one computer, for interactive access using a multidimensional player of said at least two dimensional (2D) data.

10. The method according to claim 1, further comprising:
    creating, by the at least one computer, a virtual camera and matching said virtual camera's motion to observed motion of a camera originally capturing said video information.

11. The method according to claim 10, wherein said matching said camera motion comprises at least one of:
    matching using a brute force method;
    matching using a software application;
    matching using a motion tracking process;
    matching using an automated camera location generating process;
    matching using a radio frequency identifier (RFID) capable of determining a location of said object in motion;
    matching using a global positioning system (GPS) positioning system of determining a location of said object in motion;
    matching using an instrumented camera metadata stream;
    matching using a camera based system for determining a location of said object in motion; or
    matching using georeferencing a location of said object in motion.

12. The method according to claim 1, wherein said receiving, by the at least one computer, said video information comprises at least one of:
    receiving, by the at least one computer, video footage from a single camera; or
    receiving, by the at least one computer, video footage from a plurality of cameras.

13. The method according to claim 1, wherein said receiving, by the at least one computer, said video information comprises:
    receiving, by the at least one computer, sporting event video footage.

14. The method according to claim 13, wherein said receiving, by The at least one computer, said sporting event video footage comprises at least one of:
    receiving, by the at least one computer, footage of at least one team of players;
    receiving, by the at least one computer, team sporting event footage;
    receiving, by the at least one computer, football footage;
    receiving, by the at least one computer, basketball footage;
    receiving, by the at least one computer, soccer footage;
    receiving, by the at least one computer, hockey footage;
    receiving, by the at least one computer, tennis footage;
    receiving, by the at least one computer, individual sport footage;
    receiving, by the at least one computer, baseball footage;
    receiving, by the at least one computer, NASCAR® racing footage;
    receiving, by the at least one computer, FORMULA ONE® racing footage;
    receiving, by the at least one computer, car racing footage;
    receiving, by the at least one computer, horse racing footage;
    receiving, by the at least one computer, OLYMPIC® sporting event footage;
    receiving, by the at least one computer, bowling footage; or
    receiving, by the at least one computer, golf footage.

15. The method according to claim 1, wherein said receiving, by the at least one computer, said video information comprises:
    receiving, by the at least one computer, football video footage comprising two opposing teams of players engaged in playing a series of plays, and
    wherein said plays comprise at least one of:
      an offensive play,
      a defensive play, or
      a special teams play.

16. The method according to claim 1, wherein said receiving, by the at least one computer, said video information comprises:
    receiving, by the at least one computer, surveillance video footage.

17. The method according to claim 1, wherein said receiving, by the at least one computer, said video information comprises:
    receiving, by the at least one computer, military video footage.

18. The method according to claim 1, wherein said receiving, by the at least one computer, said video information comprises:
    receiving, by the at least one computer, security camera video footage.

19. The method according to claim 1, wherein said receiving, by the at least one computer, said metadata comprises:
    providing, by the at least one computer, a moving object tool.

20. The method according to claim 19, wherein said providing, by the at least one computer, said moving object tool comprises at least one of:
    providing, by the at least one computer, at least one directional object identifier representing said object in motion; or receiving, by the at least one computer, an indication of at least one of the proper location or orientation of said directional object for a given frame of said video information.

21. The method according to claim 19, wherein said providing, by the at least one computer, said moving object tool comprises at least one of:
   providing, by the at least one computer, a plurality of directional object identifiers representing each of a plurality of objects in motion; or
   receiving, by the at least one computer, an indication of the proper locations and orientations of each of said directional objects for a given frame of said video information.

22. The method according to claim 21, wherein said providing, by the at least one computer, said plurality of directional object identifiers comprises:
   providing, by the at least one computer, one of said plurality of directional object identifiers for at least one participant of at least one team appearing in said video information.

23. The method according to claim 22, wherein said providing, by the at least one computer, said plurality of directional object identifiers comprises:
   providing, by the at least one computer, a plurality of extruded polygon directional object identifiers.

24. The method according to claim 23, wherein said providing, by the at least one computer, said plurality of extruded polygon directional object identifiers comprises:
   providing, by the at least one computer, a plurality of homeplate-shaped pentagonally extruded directional object identifiers, wherein a pointed end of each of said identifiers is pointed in a direction of movement of each of said participants.

25. The method according to claim 19, wherein said providing, by the at least one computer, said moving object tool comprises at least one of:
   providing, by the at least one computer, a block out tool for scrubbing said video information, or
   allowing, by the at least one computer, movement of or rotation of said directional object identifiers.

26. The method according to claim 21, wherein said providing, by the at least one computer, said moving object tool comprises at least one of:
   providing, by the at least one computer, a block out tool for scrubbing said video information, or
   allowing, by the at least one computer, movement of or rotation of said directional object identifiers.

27. The method according to claim 21, wherein said generating, by the at least one computer, at least 2D data comprises:
   selecting, by the at least one computer, from a plurality of predetermined animation objects, a selected animation object to associate with said directional object.

28. The method according to claim 26, wherein said generating, by the at least one computer, at least 2D data comprises:
   selecting, by the at least one computer, from a plurality of predetermined animation objects, a selected animation object to associate with said directional object.

29. The method according to claim 21, wherein said generating, by the at least one computer, at least 2D data comprises:
   replacing, by the at least one computer, said directional object with an at least 2D character object.

30. The method according to claim 28, wherein said generating, by the at least one computer, at least 2D data comprises:
   replacing, by the at least one computer, said directional object with an at least 2D character object.

31. The method according to claim 19, wherein said providing, by the at least one computer, said moving object tool comprises:
   providing, by the at least one computer, a ball object identifier.

32. The method according to claim 31, wherein said generating, by the at least one computer, at least 2D data comprises:
   adding, by the at least one computer, a ball object.

33. The method according to claim 19, wherein said providing, by the at least one computer, said moving object tool comprises:
   providing, by the at least one computer, a first down line, or
   providing, by the at least one computer, a plane object identifier.

34. The method according to claim 19, wherein said providing, by the at least one computer, said moving object tool comprises:
   providing, by the at least one computer, an end zone line, or
   providing, by the at least one computer, a plane object identifier.

35. The method according to claim 1, wherein said generating, by the at least one computer, at least 2D data comprises:
   generating, by the at least one computer, a 3D animation.

36. The method according to claim 1, wherein said generating, by the at least one computer, at least 2D data comprises:
   generating, by the at least one computer, an enhanced 2D realtime animation online gametracker.

37. The method according to claim 1, wherein said generating, by the at least one computer, at least 2D data comprises:
   generating, by the at least one computer, an enhanced simulated 3D realtime animation online gametracker.

38. A system of creating at least two dimensional (2D) data from video, comprising:
   means for receiving video information comprising a plurality of frames of digital video;
   means for receiving metadata, said metadata relating to at least one object in motion in said digital video;
   means for creating an animated and annotated boxes file based on said metadata;
   means for calculating relative blend weights for movement animations of said at least one object in motion; and
   means for generating at least 2D data from said animated and annotated boxes file and said relative blend weights.

39. A machine-readable storage medium that provides instructions on said storage medium, which when executed by at least one computing platform, cause said at least one computing platform to perform operations creating at least two dimensional (2D) data from video, said operations comprising a method comprising:
   receiving, by the at least one computing platform, video information comprising a plurality of frames of digital video;
   receiving, by the at least one computing platform, metadata, said metadata relating to at least one object in motion in said digital video;
   creating, by the at least one computing platform, an animated and annotated boxes file based on said metadata;
   calculating, by the at least one computing platform, relative blend weights for movement animations of said at least one object in motion; and generating, by the at least one computing platform, at least 2D data from said animated and annotated boxes file and said relative blend weights.

40. The machine-readable storage medium according to claim 39, wherein the method may further include:
providing, by the at least one computing platform, a data stream of at least 2D animation data for integration with at least one other product, said other product comprising at least one of:
an online game tracker application,
a fantasy football enhanced tracking site,
a television broadcast; or
an online broadcast.

41. A system of creating at least two dimensional (2D) data from video data captured from a video source, comprising:
a bus adapted to receive the video data;
at least one processor coupled to said bus, wherein said at least one processor is adapted to generate and animated and annotated boxes file based on metadata relating to at least one object in motion in the video data, to calculate relative blend weights for movement animations of the at least one object in motion, and to generate at least 2D data from said animated and annotated boxes file and said relative blend weights; and
a storage device coupled to said bus, wherein said storage device is adapted to store the at least 2D data.

42. The system according to claim 41, further comprising:
a video input device coupled to the video source, wherein said video input device is coupled to said bus and adapted to receive video information comprising a plurality of frames of digital video.

43. The system according to claim 41, further comprising:
a control interface coupled to said bus, wherein said control interface is adapted to receive the metadata.

44. The system according to claim 41, further comprising:
an output device coupled to said bus, wherein said output device is adapted to display the at least 2D data.

* * * * *